(12) United States Patent
Stoehr

(10) Patent No.: US 9,168,689 B2
(45) Date of Patent: Oct. 27, 2015

(54) DURABLE, QUIET HUBLESS CASTER TECHNOLOGY

(75) Inventor: Kyle C. Stoehr, Waukesha, WI (US)

(73) Assignee: NGS CAPITAL MANAGEMENT, LLC, Oconomowoc, WI (US)

( * ) Notice: Subject to any disclaimer, the term of this patent is extended or adjusted under 35 U.S.C. 154(b) by 0 days.

(21) Appl. No.: 13/492,784

(22) Filed: Jun. 8, 2012

(65) Prior Publication Data

US 2013/0326844 A1   Dec. 12, 2013

(51) Int. Cl.
| | |
|---|---|
| A47B 91/00 | (2006.01) |
| B29C 45/14 | (2006.01) |
| B60B 27/00 | (2006.01) |
| B60B 37/10 | (2006.01) |
| B60B 33/00 | (2006.01) |

(52) U.S. Cl.
CPC ........... *B29C 45/1459* (2013.01); *B60B 27/001* (2013.01); *B60B 37/10* (2013.01); *B60B 33/0042* (2013.01); *B60B 33/0049* (2013.01); *B60B 33/0057* (2013.01); *B60B 33/0068* (2013.01); *B60B 33/0073* (2013.01); *B60B 2900/321* (2013.01); *Y10T 16/18* (2015.01); *Y10T 16/1847* (2015.01)

(58) Field of Classification Search
CPC .......................... B60B 33/028; B60B 33/0049
USPC ....................................................... 16/45, 46
See application file for complete search history.

(56) References Cited

U.S. PATENT DOCUMENTS

| | | | |
|---|---|---|---|
| 285,912 A | 10/1883 | Meehan | |
| 978,161 A | 12/1910 | Holmes | |
| 1,697,485 A | 1/1929 | Ware | |
| 2,544,924 A | 3/1951 | Herold | |
| 2,701,740 A | 2/1955 | Norman | |
| 3,755,852 A | 9/1973 | Greene | |
| 3,807,817 A | 4/1974 | Black | |
| 3,834,006 A | 9/1974 | Greene | |
| 3,997,938 A | 12/1976 | Pinaire et al. | |
| 4,045,096 A | 8/1977 | Lidov | |
| 4,054,335 A | 10/1977 | Timmer | |

(Continued)

FOREIGN PATENT DOCUMENTS

| | | |
|---|---|---|
| WO | WO2005118314 | 12/2005 |
| WO | WO2005119074 | 12/2005 |
| WO | WO2008034741 | 3/2008 |

OTHER PUBLICATIONS

The Best Designers of the Red Dot Award: Product Design 2006: Roland Kausemann, Frank Newey, Jorg Ostrenrieder and Marcus Widermann: www.en.red-dot.org/1851.htm [assessed on Apr. 29, 2009, 3 pages].

*Primary Examiner* — Victor Batson
*Assistant Examiner* — Matthew Sullivan
(74) *Attorney, Agent, or Firm* — Fredrikson & Byron, P.A.

(57) ABSTRACT

Embodiments of the present invention provide a hubless caster that is at least as aesthetically pleasing as prior art hubless casters but that is significantly more durable. In one aspect, a hubless caster is provided that includes a frame member having two opposed sides. A generally ring-shaped mount portion projects from at least one of the two opposed sides of the frame member. In some embodiments, the hubless caster has the following three components mounted on the mount portion, in sequence moving radially outwardly from the mount portion: a) an annular backbone member defining an inner bearing race, b) a rolling element, and c) a wheel defining an outer bearing race.

20 Claims, 22 Drawing Sheets

(56) References Cited

U.S. PATENT DOCUMENTS

| | | |
|---|---|---|
| 4,219,904 A | 9/1980 | Melara |
| 4,348,785 A | 9/1982 | Jordan |
| 4,465,321 A | 8/1984 | Berg |
| 4,544,425 A | 10/1985 | Provolo |
| 4,720,894 A | 1/1988 | Deasy et al. |
| 4,916,801 A | 4/1990 | Cooper |
| 5,068,943 A | 12/1991 | Estkowski et al. |
| 5,078,221 A | 1/1992 | Rewitzer |
| 5,119,525 A | 6/1992 | Melara |
| 5,226,739 A | 7/1993 | Estkowski et al. |
| 5,230,571 A | 7/1993 | Estkowski et al. |
| 5,248,019 A | 9/1993 | Sbarro |
| 5,263,238 A | 11/1993 | Cooper |
| 5,303,449 A | 4/1994 | Gray |
| 5,419,619 A | 5/1995 | Lew |
| 5,490,719 A | 2/1996 | Lew |
| 5,493,755 A | 2/1996 | Kindstrand et al. |
| 5,568,671 A | 10/1996 | Harris et al. |
| 6,336,685 B1 | 1/2002 | Orr |
| 6,748,623 B1 | 6/2004 | Tsai |
| 6,839,939 B2 | 1/2005 | Donakowski |
| 7,150,070 B2 | 12/2006 | Donakowski |
| 7,207,084 B2 | 4/2007 | Melara |
| 7,647,673 B2 * | 1/2010 | Melara ............... 16/35 R |
| 8,375,515 B2 * | 2/2013 | Hozumi et al. ............ 16/47 |
| 8,561,258 B2 | 10/2013 | Breyer et al. |
| 2005/0081329 A1 | 4/2005 | Tsai |
| 2007/0143958 A1 | 6/2007 | Trivini |
| 2007/0186373 A1 * | 8/2007 | Melara ............... 16/35 R |
| 2008/0163455 A1 * | 7/2008 | Tsai .................... 16/46 |
| 2009/0314596 A1 * | 12/2009 | Miyoshi ............ 190/18 A |
| 2010/0306962 A1 * | 12/2010 | Breyer et al. ............ 16/46 |

* cited by examiner

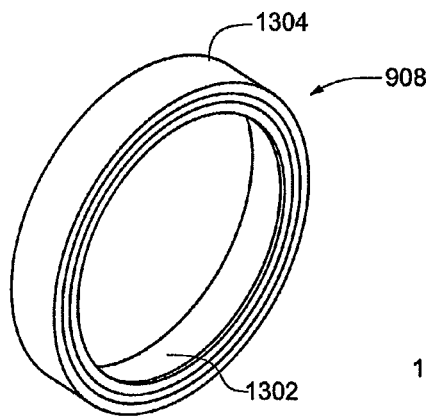
Fig. 13A
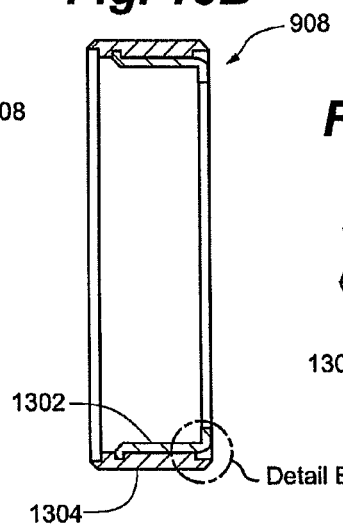
Fig. 13B
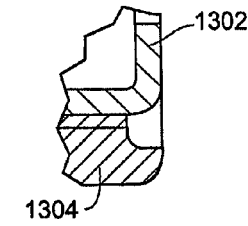
Fig. 13C
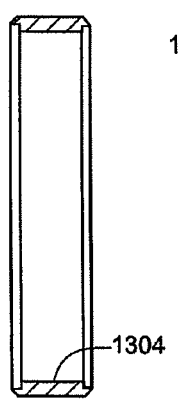
Fig. 13D
Fig. 13E
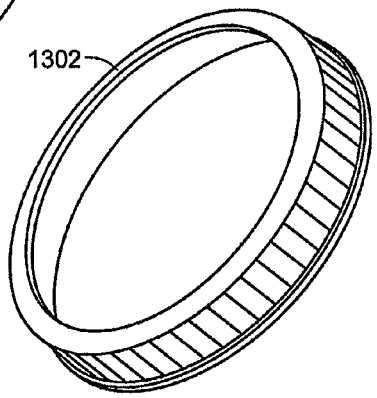
Fig. 13F

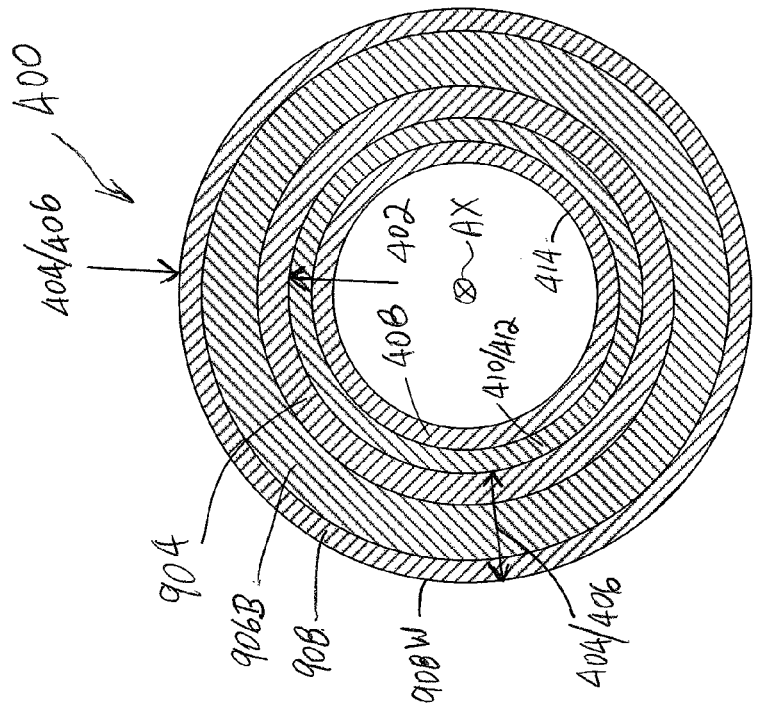
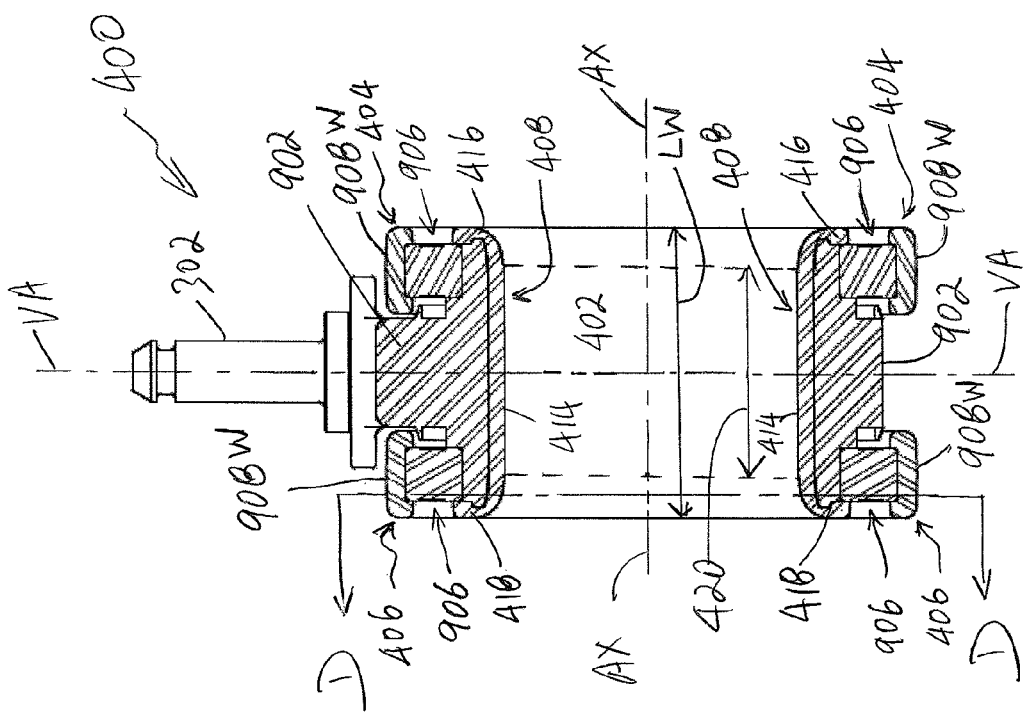
FIG. 22
FIG. 21

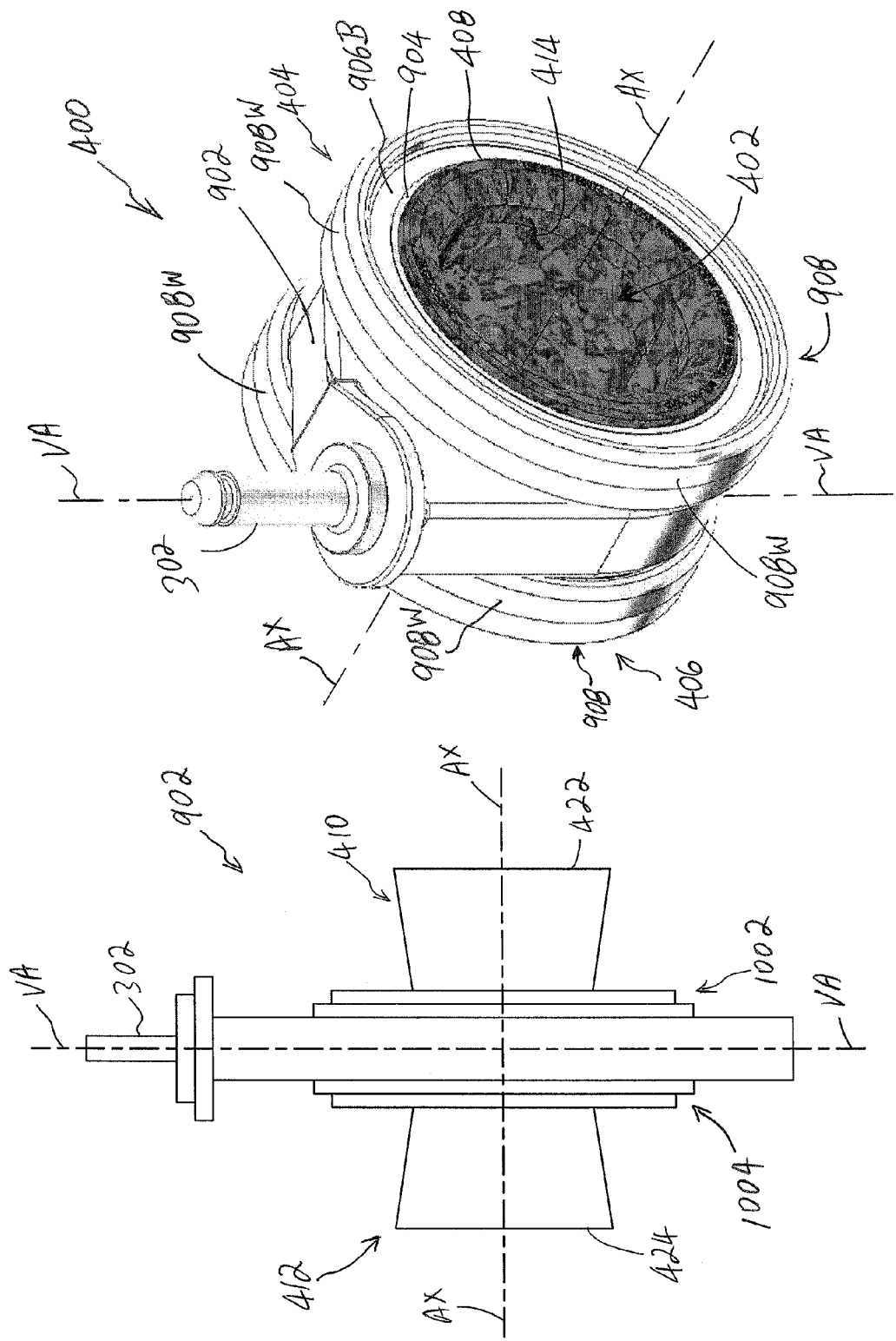

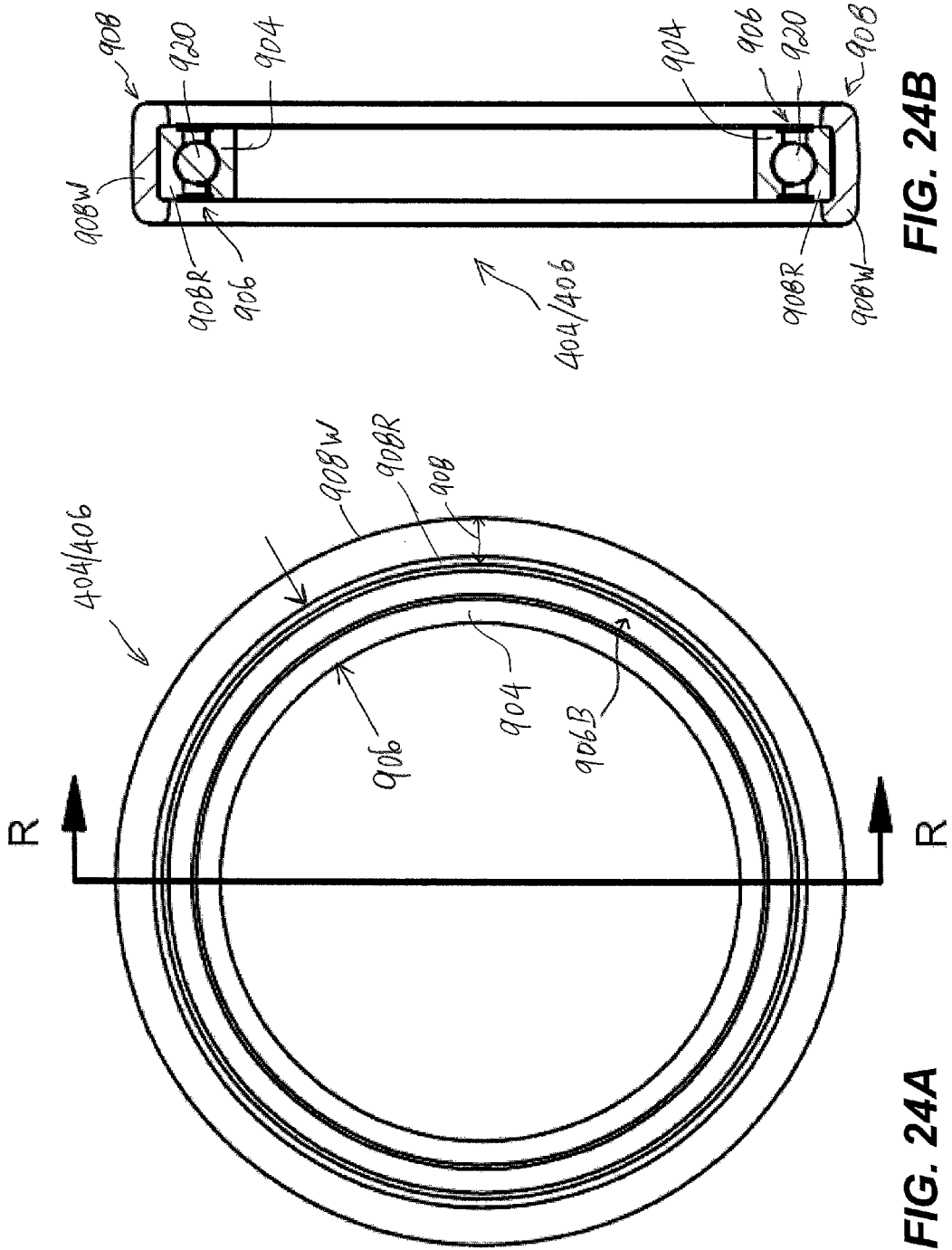

DURABLE, QUIET HUBLESS CASTER TECHNOLOGY

BACKGROUND

Caster assemblies are well known. They are provided on a wide variety of articles that are moveable by rolling, including chairs and other furniture (tables, sofas, beds, etc.), stands for medical equipment and other instrumentation, cabinets, work surfaces, dollies, and the like. FIG. 1 shows one type of conventional caster assembly 10. Here, the caster assembly 10 includes a wheel 12 that is rotationally coupled to a caster frame 14. The caster frame 14 is coupled to a caster stem 16, which allows the caster assembly 10 to be attached to an article (not shown in FIG. 1) such that the wheel 12 is free to pivot relative to the article.

FIG. 2 shows an exploded view of a prior art caster assembly 200 that has no central hub. Such caster assemblies are known as hubless casters. Hubless casters typically provide a more aesthetically pleasing appearance, as compared to conventional hubbed casters. However, due to various design limitations, previous hubless casters have not delivered the performance necessary for widespread adoption.

One key performance deficiency of prior art hubless casters is durability. Certain prior art designs would simply wear out too quickly. One reason for this lack of durability relates to how the frame member 202 of such hubless casters 200 interfaces with the rolling element 204. The rolling element 204 shown in FIG. 2, for example, is mounted directly on a mount portion 206 of the frame member 202. In other words, the mount portion of the frame member itself defines the inner bearing race. As a consequence, when the caster rolls, rollers 208 (or ball bearings) of the rolling element 204 bear directly against the mount portion 206. Over time, this can cause the mount portion 206 to wear prematurely (note that in a design of this nature, the inner race defined by the mount portion is a primary wear component). As a result, the longevity and overall performance of the hubless caster can be diminished significantly.

Certain other prior art hubless casters lack durability, or do not perform as well as they could, due to a narrow distribution of load across the width of the mount portion 206. The width of an exemplary mount portion 206 is shown as W in FIG. 2. Some prior art hubless casters concentrate the load exerted on the mount portion in a narrow region of the mount portion. For example, a row of relatively small ball bearings may be provided, and these ball bearings may only contact a small width of the mount portion. The resulting highly concentrated load can accelerate wear on the mount portion, and this can impair the longevity and overall performance of such hubless casters.

SUMMARY

Certain embodiments of the present invention provide a hubless caster that is at least as aesthetically pleasing as prior art hubless casters but is significantly more durable. Some embodiments provide a durable separate sleeve (or "annular backbone member") that defines an inner bearing race and protects the mount portion of the central frame member, thereby preventing premature wear of the mount portion. In many instances, providing this backbone member in combination with a rolling element and an outer wheel provides enhanced durability for the hubless caster. Additionally, some embodiments are configured to provide a well distributed (e.g., width-wise) force transfer from the wheel, through the rolling element, then through the backbone member, and to the mount portion of the frame member.

In some embodiments, the invention provides a hubless caster comprising a frame member with two opposed sides from at least one of which projects a generally ring-shaped mount portion. In the present embodiments, the hubless caster includes the following three components mounted on the mount portion, in sequence moving radially outwardly from the mount portion: a) an annular backbone member defining an inner bearing race, b) a rolling element, and c) a wheel defining an outer bearing race.

Some embodiments of the invention provide a durable low profile hubless caster. Here, the caster has a hubless roller assembly with an outer wheel radius and a radial thickness. In the present embodiments, the radial thickness of the hubless roller assembly is less than half as great as the outer wheel radius, such that the hubless caster has a profile ratio of less than 0.5 and yet the hubless caster has a dynamic load rating of at least 150 pounds.

In certain embodiments, the invention provides a hubless caster comprising a frame member having two opposed sides from at least one of which projects a generally ring-shaped mount portion. In the present embodiments, the hubless caster has the following three components mounted on the mount portion, in sequence moving radially outwardly from the mount portion: a) an annular backbone member defining an inner bearing race, b) a rolling element, and c) a wheel defining an outer bearing race. In the present embodiments, the hubless caster is provided with a roller-retention end cap, and the end cap is joined to the mount portion so as to retain the annular backbone member, rolling element, and wheel on the frame member.

Some embodiments of the invention provide a hubless caster having a low friction ring that defines a wheel. In the present embodiments, the low friction ring is adapted to slide in a channel of the caster, and the caster is devoid of ball bearings and roller bearings.

Certain embodiments of the invention provide a hubless caster having an open central corridor defined, at least in part, by a central frame member having with first and second opposed annular mount portions. A retention wall, located radially inwardly of the central frame member and the annular mount portions, defines a radially inwardly oriented facing surface exposed to the hubless caster's central corridor. In the present embodiments, the retention wall is a single integral wall which defines, at least in part, first and second opposed retainer lips and a central span extending therebetween and substantially parallel to a central axis of the central corridor. Each retainer lip flares radially outwardly from the central span and is configured for retaining a wheel/bearing assembly on a corresponding annular mount portion. As such, the first and second retainer lips respectively retain the first and second wheel/bearing assemblies on the corresponding first and second annular mount portions. First and second wheel/bearing assemblies respectively include a first and a second wheel configured to rotate about the central axis relative to the retention wall.

Some embodiments of the invention provide a hubless caster having an open central corridor defined, at least in part, by the following components in sequence in a direction extending radially outwardly from the central corridor: a generally cylindrical innermost wall configured as a retention wall, a generally cylindrical mount portion, a bearing, and a wheel. The retention wall defines a radially inwardly oriented facing surface exposed to the hubless caster's central corridor, and includes one or more radially outwardly flared retainer lips. The bearing is mounted on the generally cylindrical mount portion and the retention wall is molded to the generally cylindrical mount portion such that the retainer lip extends around and embraces a transverse side of the bearing mounted on the mount portion. As such, the retention wall is configured for preventing the bearing from moving transversely off the mount portion by virtue of the retainer lip being carried against the transverse side of the bearing.

In certain embodiments, the invention provides a method of manufacturing a hubless caster having an open central corridor. The method includes mounting a wheel/bearing assembly on an annular mount portion of a subassembly of the hubless caster having a frame member. A retention wall is over-molded onto the subassembly so as to secure the wheel/bearing assembly between the frame member and a retainer lip of the retention wall, such that the resulting retention wall is located radially inwardly of the frame member and the annular mount portion. As such, the retention wall defines, at least in part, a radially inwardly oriented facing surface exposed to the hubless caster's open central corridor.

In some embodiments, the invention provides a hubless caster having an open central corridor, and an innermost wall defining a radially inwardly oriented facing surface exposed to the central corridor. The innermost wall is a single integral wall having a base layer and a second layer, wherein the second layer is thinner than the base layer and defines at least part of the facing surface.

BRIEF DESCRIPTION OF THE DRAWINGS

The following drawings are illustrative of particular embodiments of the present invention and therefore do not limit the scope of the invention. The drawings are not necessarily to scale and are intended for use in conjunction with the explanations in the following detailed description. Embodiments of the present invention will hereinafter be described in conjunction with the appended drawings, wherein like numerals denote like elements.

FIG. 13A is a perspective view of a wheel according to an embodiment of the present invention; FIG. 13B is a cross-sectional view of the wheel of FIG. 13A; FIG. 13C is a detail view of region B (see FIG. 13B) of the wheel of FIG. 13A;

FIG. 13D is a cross-sectional view of an exterior ring of the wheel of FIG. 13A; FIG. 13E is a perspective view of the exterior ring of FIG. 13D; and FIG. 13F is a perspective view of a bearing interface ring of the wheel of FIG. 13A;

FIG. 21 is a schematic cross-sectional view of the hubless caster of FIG. 19;

FIG. 22 is a schematic cross-sectional view of the hubless caster of FIG. 19 taken along lines D-D of FIG. 21;

FIG. 23 is a schematic front view of a hubless caster in accordance with certain embodiments of the invention; and FIG. 24A is a side view of a wheel/bearing assembly used in a hubless caster in accordance with an embodiment of the invention.

FIG. 24B is a cross-sectional view of the wheel/bearing assembly of FIG. 24A taken along lines R-R;

FIG. 25 is a perspective view of a hubless caster having a retention wall comprising a thin film molded layer in accordance with certain embodiments of the invention;

DETAILED DESCRIPTION OF PREFERRED EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the examples provided have suitable alternatives that can be used.

Figure 3:
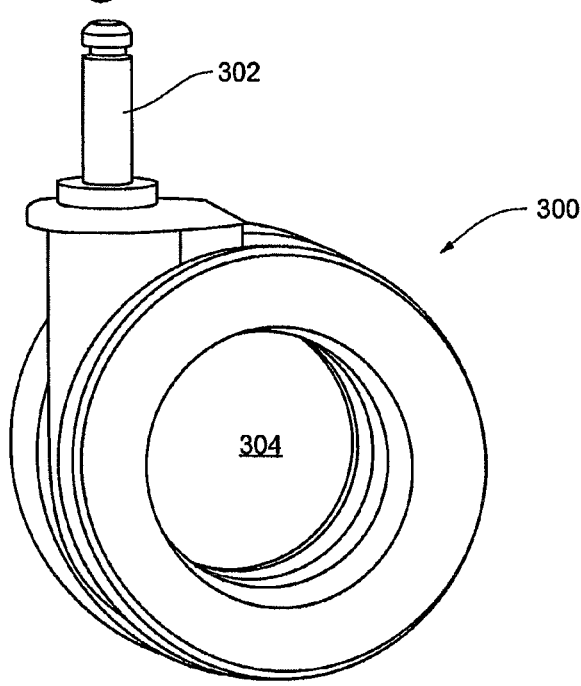
FIG. 3 is a perspective view of a hubless caster according to an embodiment of the present invention.
Figure 4:
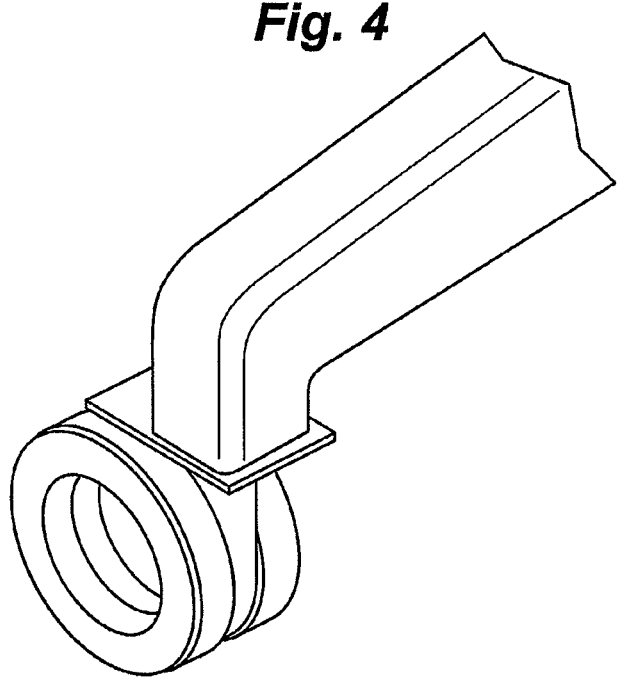
FIG. 4 is a perspective view of the hubless caster of FIG. 3 in connection with the leg of a chair or other structure.
Figure 5:
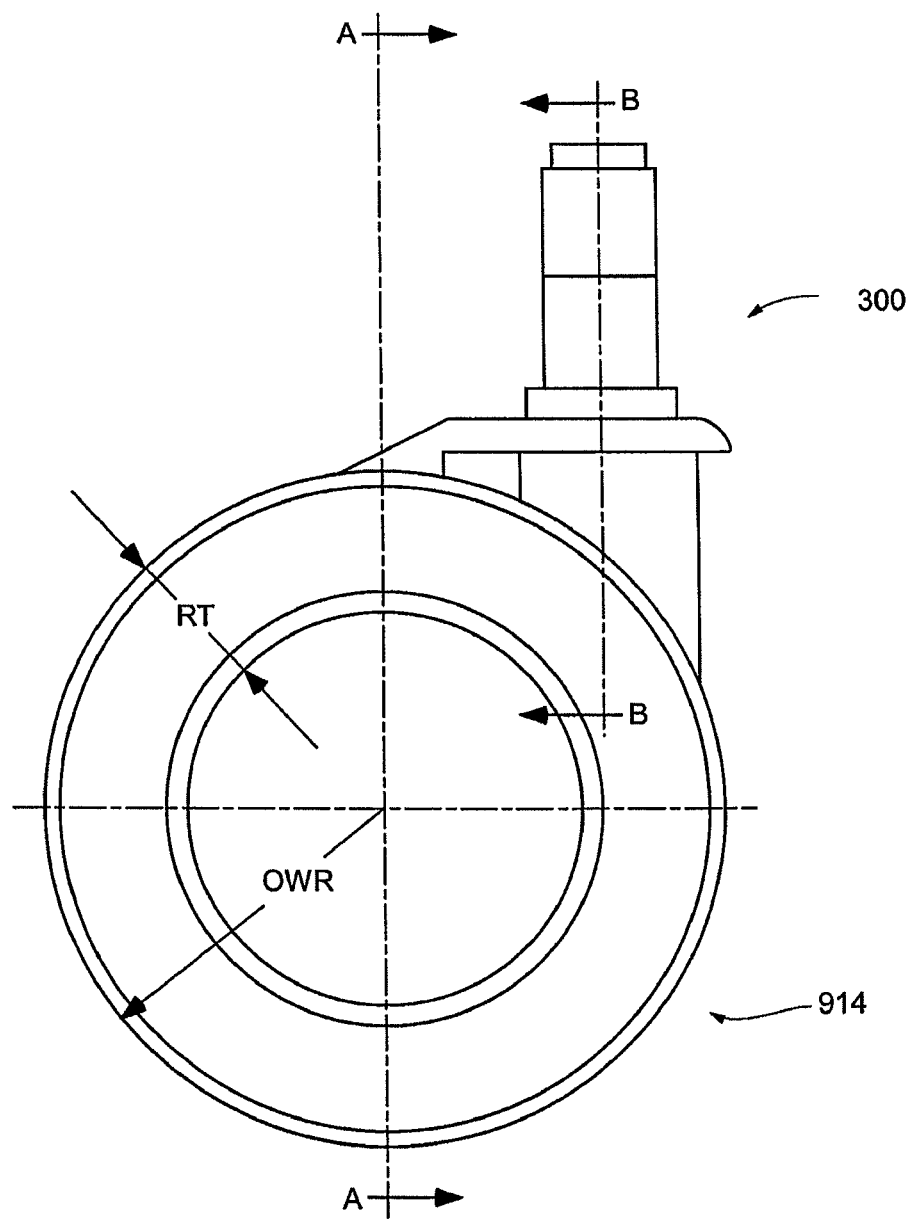
FIG. 5 is a side view of the hubless caster of FIG. 3.
Figure 6:
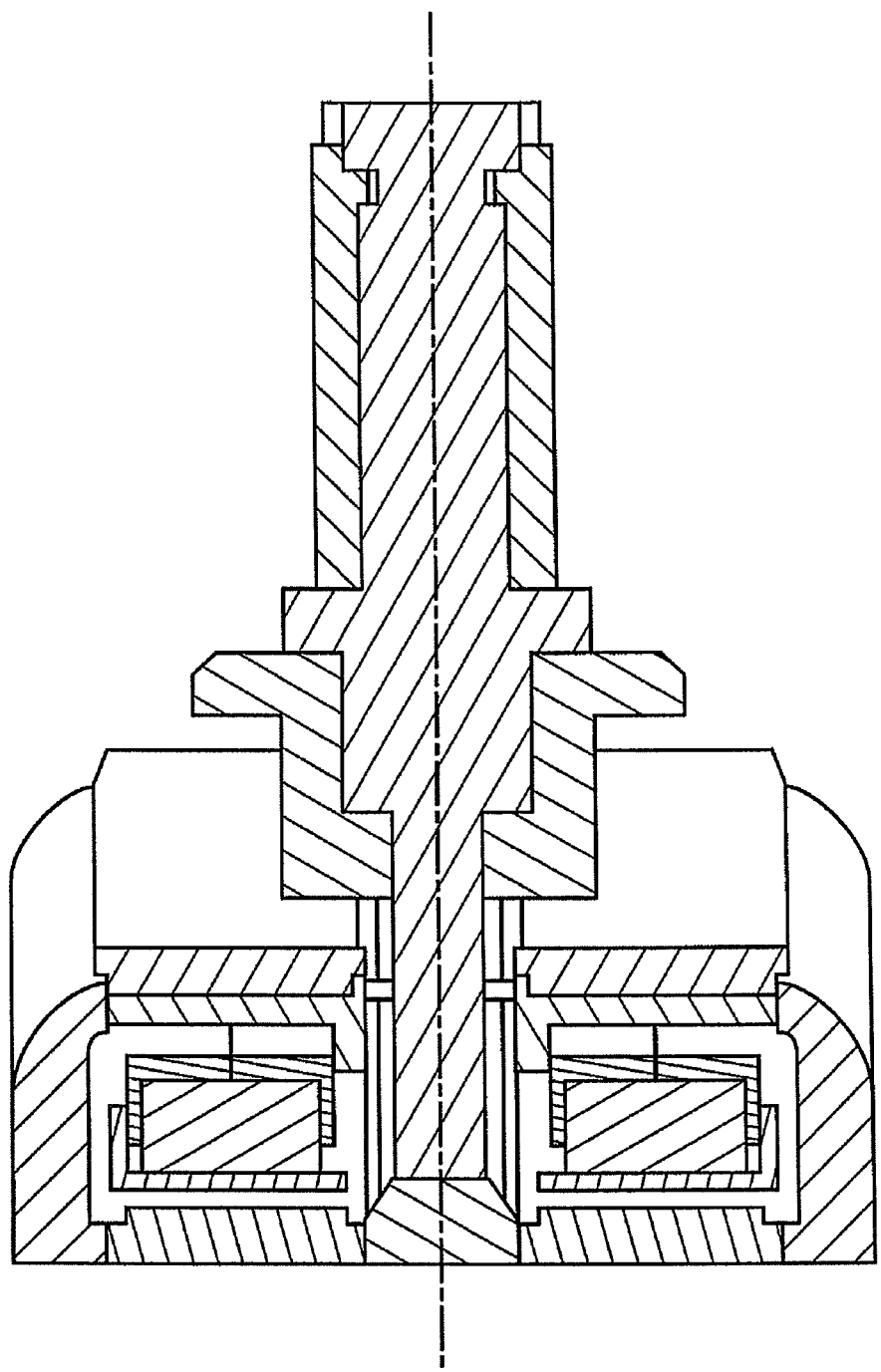
FIG. 6 is a cross-sectional view of section B-B (see FIG. 5) of the hubless caster of FIG. 3.
Figure 7:
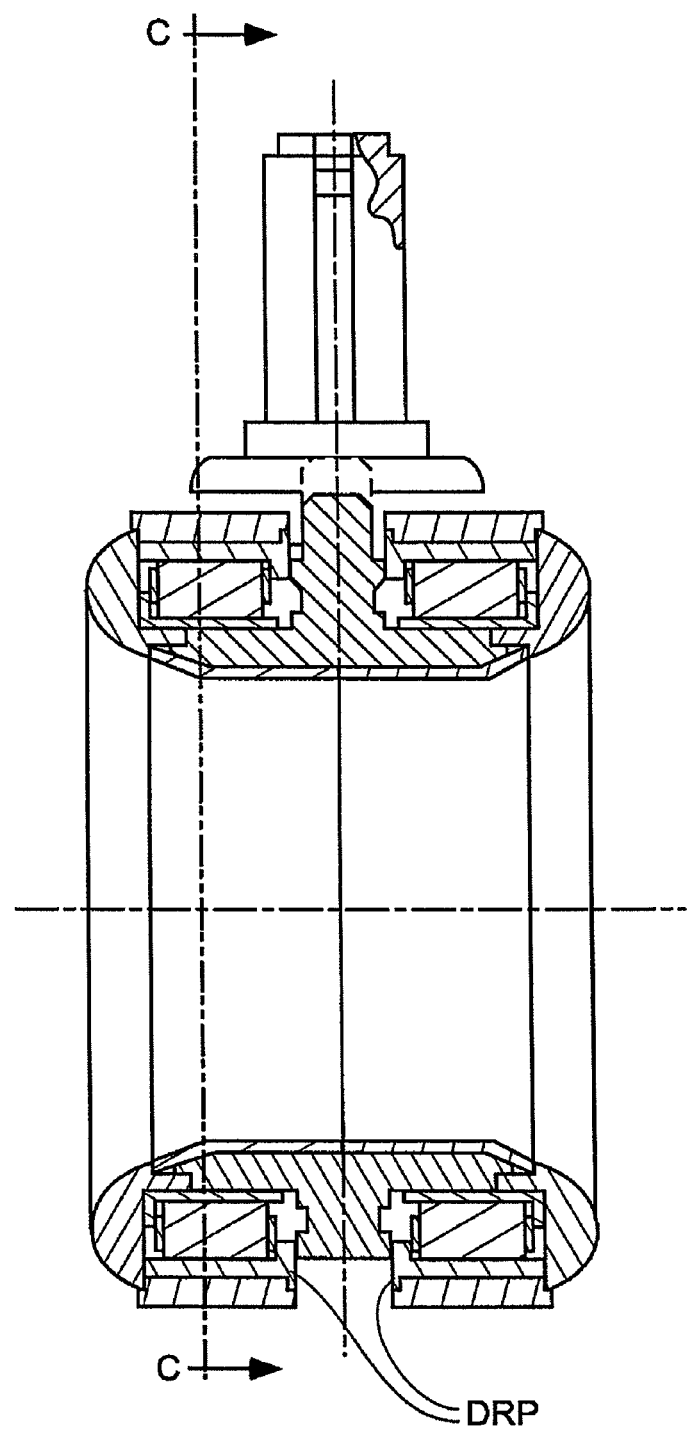
FIG. 7 is a cross-sectional view of section A-A (see FIG. 5) of the hubless caster of FIG. 3.
Figure 8:
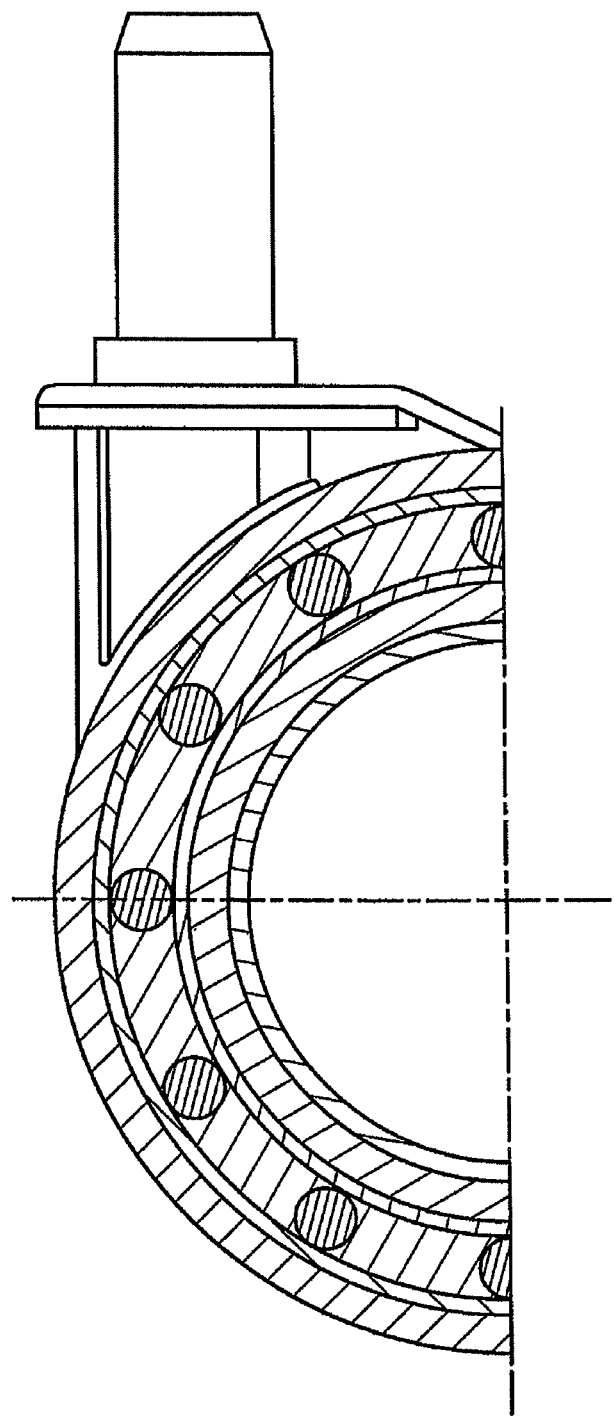
FIG. 8 is a cross-sectional view of section C-C (see FIG. 7) of the hubless caster of FIG. 3.

FIGS. 3-4 show perspective views of a hubless caster 300 according to certain embodiments of the present invention. As shown, the hubless caster 300 includes (or defines) a central opening 304, where the hub would be located on a conventional hubbed caster. The illustrated central opening 304 is generally cylindrical, having a longitudinal axis that is generally parallel to the surface on which the hubless caster 300 is configured to roll. Thus, on the longitudinal axis of the caster 300, there is no caster material (instead, there is just an open space). FIG. 3 shows the hubless caster 300 with a caster stem 302, and FIG. 4 shows the hubless caster 300 mounted to the leg of a chair or other article. FIG. 5 shows a side view of the hubless caster 300, FIGS. 6-7 are cross-sectional views referenced in FIG. 5, and FIG. 8 is a cross-sectional view referenced in FIG. 7. While the illustrated central opening 304 is round, other configurations can be used (e.g., the opening can alternatively be square, or it can take the shape of some other polygon).

Figure 9:
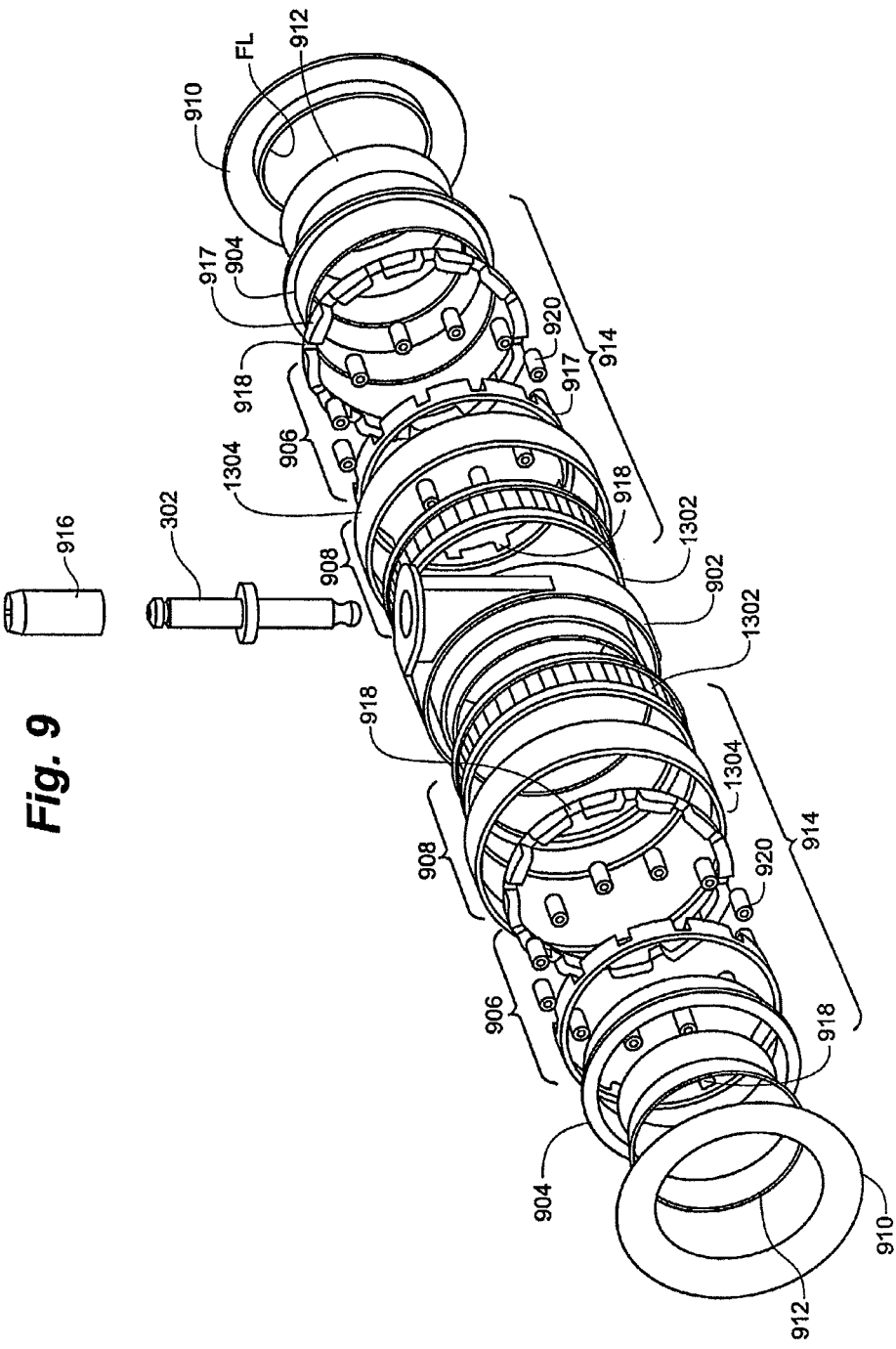
FIG. 9 is an exploded view of the hubless caster of FIG. 3.
Figure 10A:
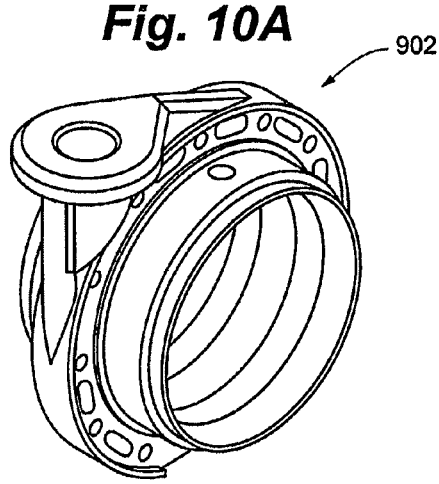
FIG. 10A is a perspective view of a central frame member according to an embodiment of the present invention.
Figure 10B:
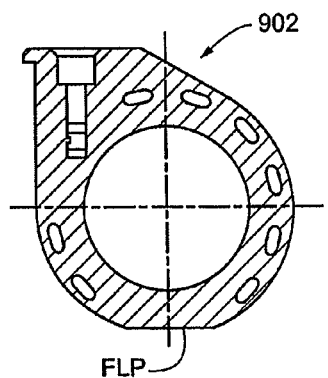
FIG. 10B is a cross-sectional view of the central frame member of FIG. 10A.
Figure 10C:
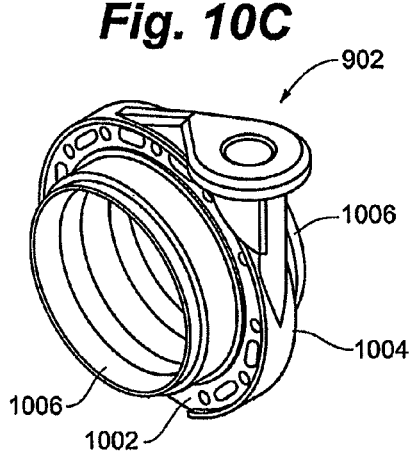
FIG. 10C is another perspective view of the central frame member of FIG. 10A.
Figure 10D:
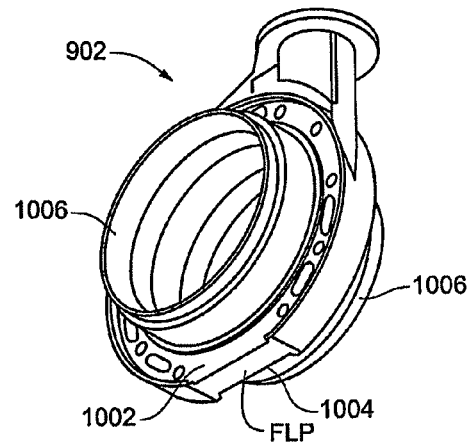
FIG. 10D is yet another perspective view of the central frame member of FIG. 10A.
Figure 18:
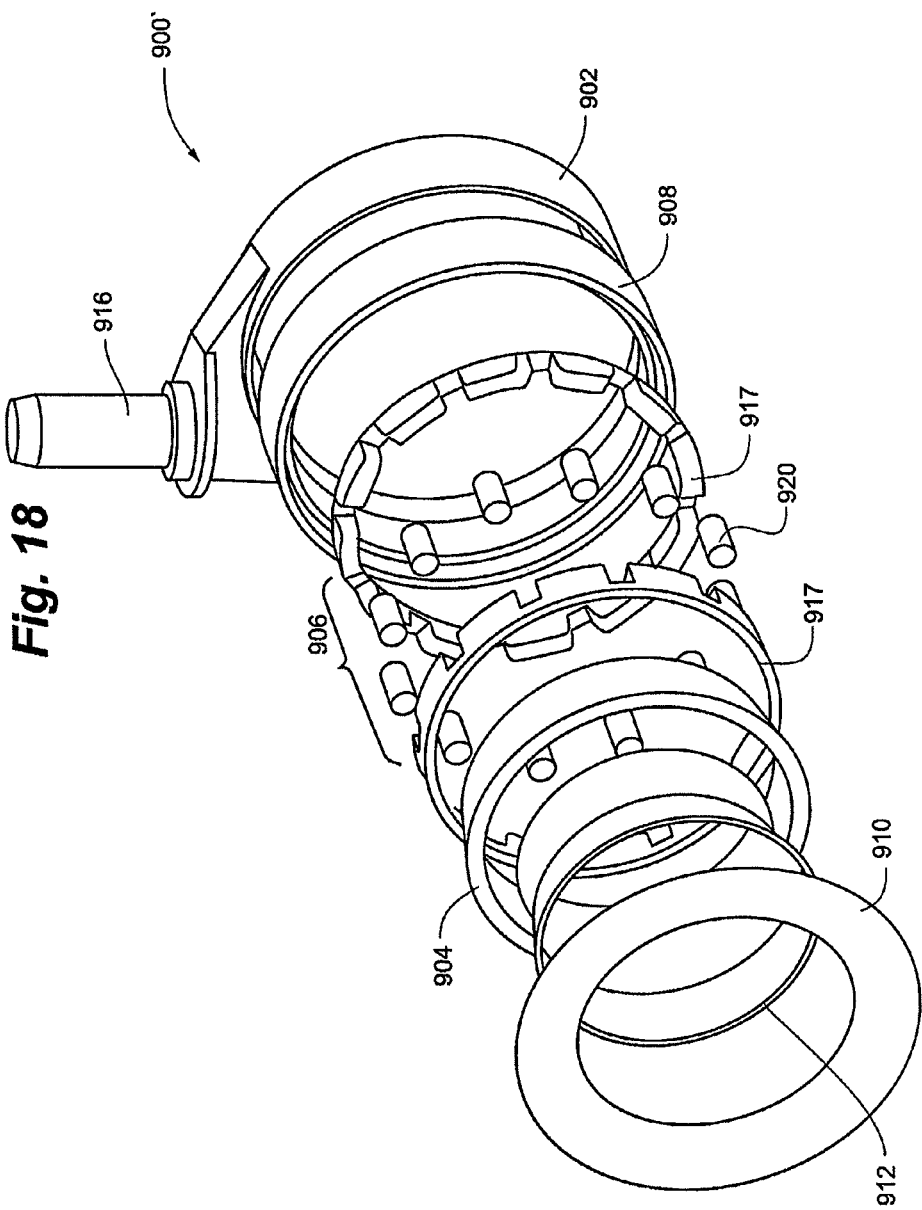
FIG. 18 is an exploded view of a hubless caster having a single-wheel design in accordance with certain embodiments of the invention.

FIG. 9 shows an exploded view of one hubless caster 300 embodiment, which includes a caster stem 302 and a friction sleeve 916. The caster stem can alternatively be integral to the caster frame, although this will commonly be less preferred. Also, the friction sleeve can be replaced with a conventional metal friction ring. The illustrated hubless caster 300 includes a frame member 902 and two hubless roller assemblies 914, along with corresponding liner rings 912 and end caps 910. The liner rings here are decorative and can be omitted, if so desired. While the hubless caster 300 shown in FIG. 9 has a twin-wheel design, the present caster can alternatively have a single-wheel design, as exemplified in FIG. 18.

FIGS. 10A-10D show various views of an exemplary frame member 902. Generally, the frame member 902 will include two opposed sides 1002, 1004. A mount portion 1006 (which is generally ring shaped in the illustrated embodiments) projects from one of the two opposed sides 1002, 1004. Hubless caster embodiments having two wheels generally include a central frame member with two such mount portions. In such embodiments, two mount portions project respectively from the two opposed sides 1002, 1004 of the frame member. Hubless caster embodiments having only one wheel (see FIG. 18) generally include a frame member with only one such mount portion. In some embodiments, the frame member 902 and the mount portion(s) 1006 projecting therefrom are defined by a single body. For example, the frame member 902 and the mount portion(s) 1006 can be injection molded using a polymer with a relatively high degree of hardness (as just one example, an acetal resin with 20-30% glass filler can be used). In other embodiments, the frame member 902 and the mount portion(s) 1006 are formed by a single metal body machined, cast, or formed from a suitable metal (e.g., powdered steel). Such embodiments can be useful for heavier-duty applications. In still other embodiments, the frame member 902 and the mount portion(s) 1006 can be separate components coupled together to collectively form the frame member.

Referring again to FIG. 9, each roller assembly 914 of the illustrated hubless caster 300 includes an annular backbone member 904, a rolling element 906B, and a wheel 908. These components are described in detail in the following paragraphs.

Figure 11:
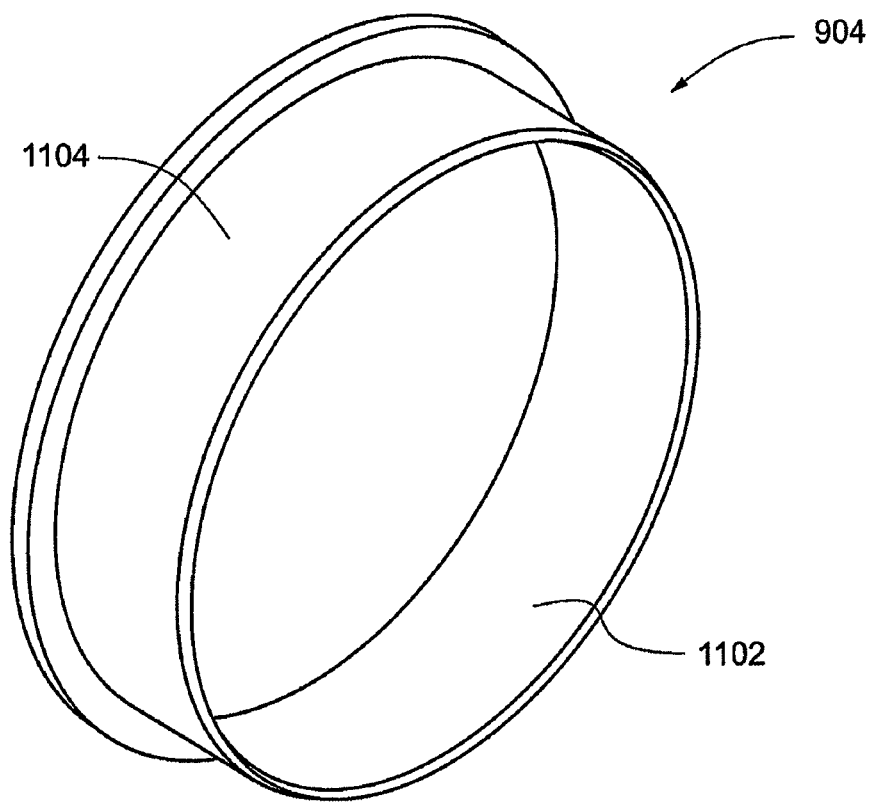
FIG. 11 is a perspective view of an annular backbone member according to an embodiment of the present invention.

The annular backbone member 904 of FIG. 9 is shown in FIG. 11. The backbone member 904 can be sized such that its inner surface 1102 contacts the outer surface of the corresponding mount portion when the backbone member is mounted on the mount portion. In preferred embodiments, the backbone member 904 is formed of a different material than the mount portion. For example, when the mount portion comprises (or consists essentially of) a polymer, the backbone member 904 preferably comprises (or consists essentially of) a metal. In certain preferred embodiments, the backbone member 904 comprises a steel ring. The backbone member can be a metal ring made, for example, by stamping, or it can be machined, cast, or formed from a suitable metal (e.g., powdered steel).

Figure 12:
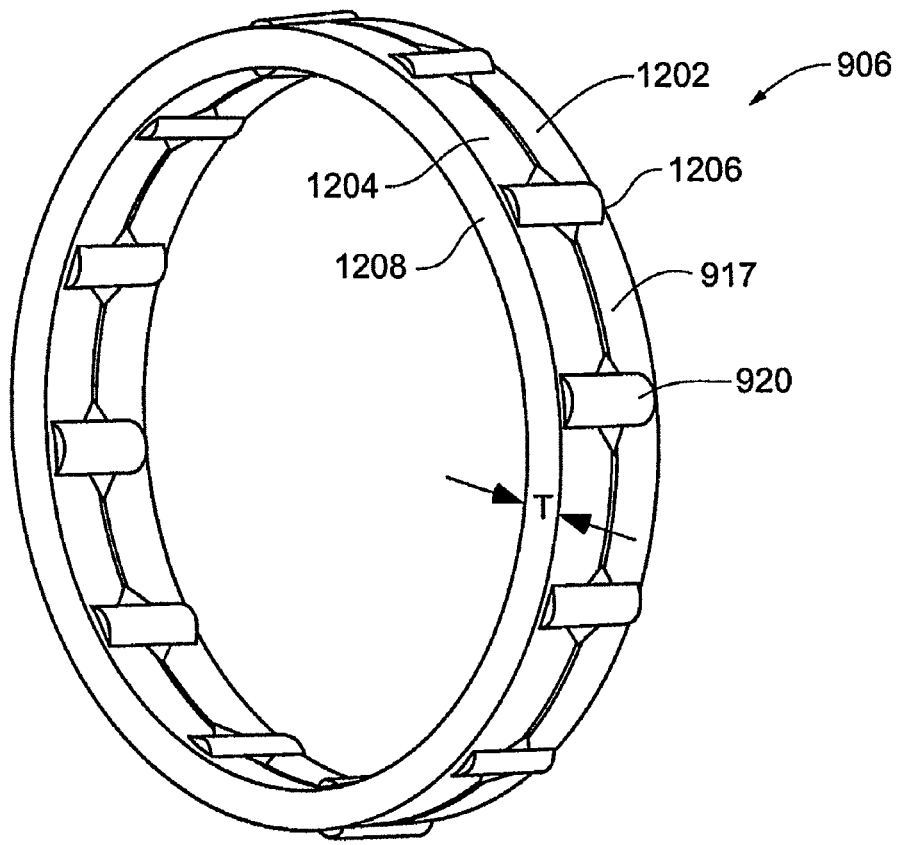
FIG. 12 is a perspective view of a rolling element according to an embodiment of the present invention.

The rolling element 906B of FIG. 9 is shown in FIG. 12. Referring to both FIGS. 9 and 12, the illustrated rolling element 906B includes a retainer 917 having receptacles 918 into which rollers (optionally having a cylindrical shape) 920 can be inserted. The diameter of the rollers 920 preferably is slightly larger than the thickness T of the retainer 917. When tangential force is applied to the rollers 920, the rollers 920 rotate within the receptacles 918. As the rollers 920 rotate, the degree of friction between the rollers 920 and the receptacles 918 preferably is low. As described below in greater detail, the rotating rollers 920 roll against both the backbone member 904 and the wheel 908 to provide the rolling functionality of the hubless caster 300. The retainer can be, for example, molded. When the rollers are metal (e.g., steel), they can be cold headed or machined. When the rollers are plastic, they can be molded. Other manufacturing methods can be used as well.

The retainer 917 of the rolling element 906B can be provided in a variety of configurations. As shown in FIGS. 9 and 12, the retainer 917 can include two pieces 1202, 1204 (e.g., two halves). To assemble a rolling element 906B having a two-piece retainer 917, the rollers 920 are inserted into the roller receptacles 918 of one of the retainer pieces 1202, 1204, and then the roller receptacles 918 of the other retainer piece 1202, 1204 are aligned and positioned such that the rollers 920 are inserted into the receptacles 918 of both retainer pieces 1202, 1204. The side edges 1206, 1208 of the retainer pieces 1202, 1204 prevent the rollers from escaping the roller receptacles 918. The two-part retainer is advantageous in terms of noise reduction. It is also advantageous in that the space in the center of the retainer can accommodate fluctuations in the roller length, e.g., the roller element will not be pinched. Further, the two part design of the illustrated retainer can make assembly automation easier.

Thus, one group of embodiments provides a hubless caster that includes at least one rolling element comprising such a two-part retainer. In these embodiments, the hubless caster can be of any design shown or described herein. However, the two-part retainer can also be used in a hubless caster of any other known design. Thus, the present embodiment group extends to any hubless caster having a two-part retainer of the nature described herein.

Figure 1:
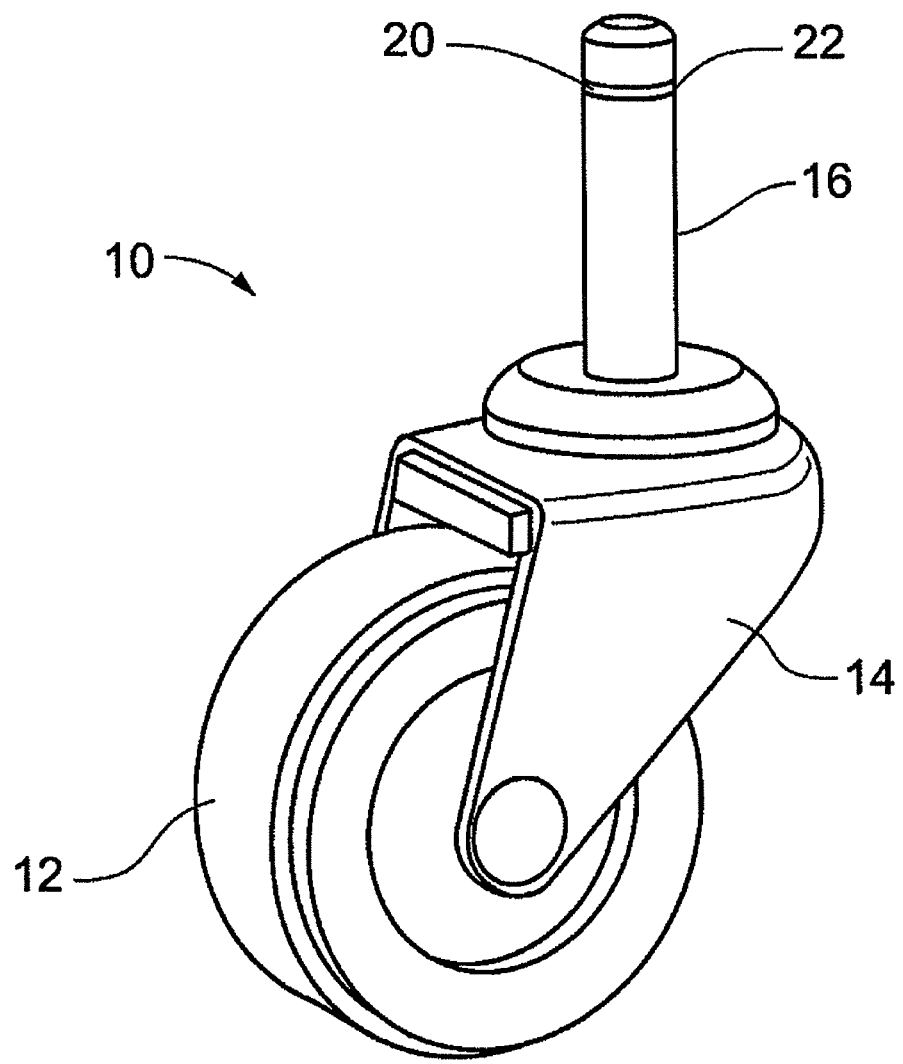
FIG. 1 is a perspective view of a prior art caster assembly.
Figure 2:
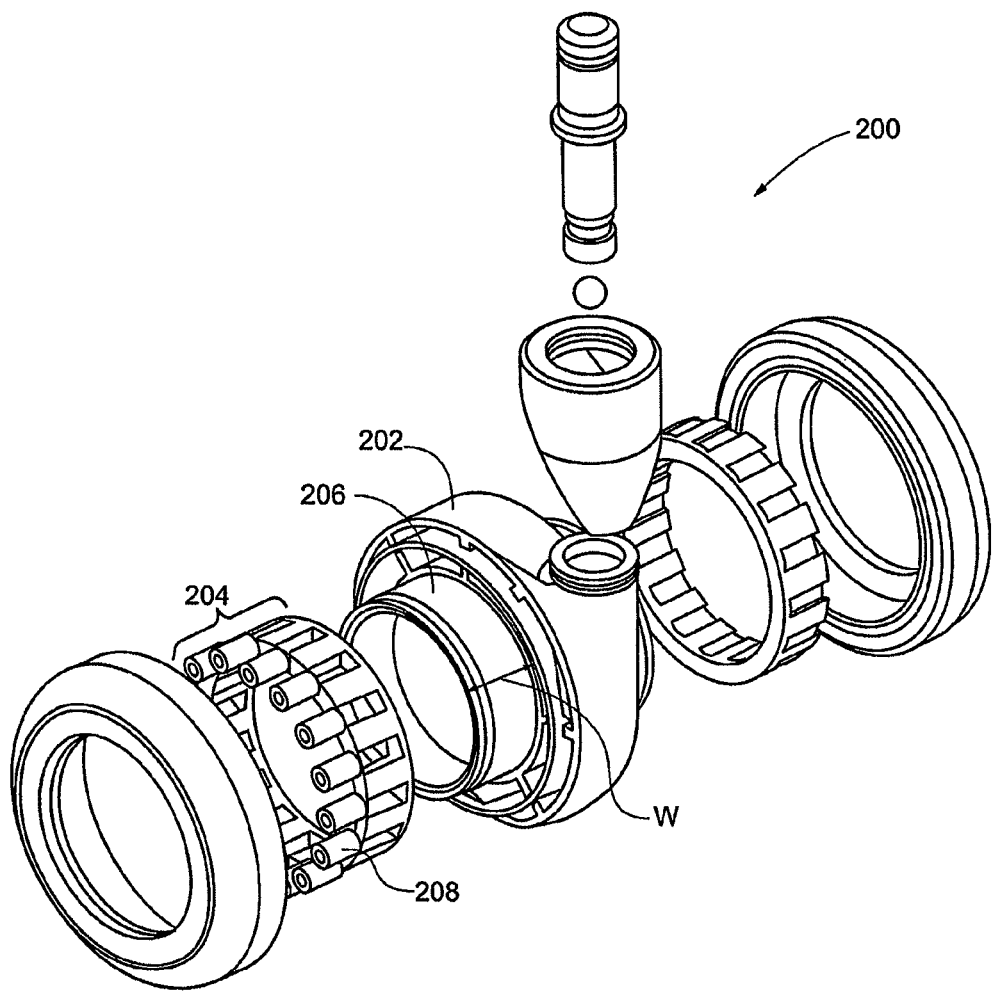
FIG. 2 is a is an exploded view of a prior art hubless caster assembly.

In other embodiments, the retainer 917 can be a single piece. One-piece retainers can have a single side edge, with the other side being open for receiving the rollers into the receptacles (e.g., as shown in FIG. 2). Other retainer configurations can be used as well.

An exemplary wheel 908 is shown in FIGS. 13A-13F. Here, the illustrated wheel 908 has an advantageous two-piece construction. Specifically, the wheel 908 includes a bearing interface ring (or "inner ring") 1302 and an exterior ring (or "outer ring") 1304. The illustrated bearing interface ring 1302 fits within the exterior ring 1304, and the two components are joined together. These two pieces can be joined together in a variety of ways (such that the bearing interface ring 1302 and the exterior ring 1304 are prevented from rotating relative to each other). In some embodiments, the exterior ring comprises (or consists essentially of) a polymer, optionally containing a filler, while the bearing interface ring comprises (or consists essentially of) a metal. As just one example, the exterior ring can be formed of acetal with about 20-30% glass fill, while the bearing interface ring is formed of steel. In these and other embodiments, the two components can be joined together via mechanical bonding. FIGS. 13A-13F depict one depict one useful form of mechanical bonding. Here, the bearing interface ring 1302 is formed of metal (e.g., steel), and the exterior ring (or "tire") 1304 comprises a polymer. The inner ring 1302 can be made by stamping, and the exterior ring 1304 can be formed onto the inner ring 1302 by insert molding. The illustrated bearing interface ring 1302 has knurling on its outer surface (see FIG. 13F), and its flange has openings, such as holes or slots. Thus, when a polymer outer ring is insert molded onto the inner ring 1302, the polymer flows into interlocking engagement with the knurling and the openings. Also, as shown in FIG. 13B, the inner ring 1302 can have a flange that rises into the outer ring. This combination of features is desirable in that it provides a two-part wheel assembly in which the outer ring 1304 is highly resistant to becoming separated from the inner ring 1302. In the bonding example just described, only mechanical bonding is used. If desired, though, a chemical bond can be used. It is to be understood that the noted bonding features are merely exemplary.

In other embodiments, the wheel can be a single ring (optionally comprising a polymer) that interfaces with both the rolling element and the surface (e.g., the ground) on which the hubless caster is configured to roll.

Referring to FIGS. 9 and 10A-10D, when the hubless caster 300 is assembled, multiple components are mounted on the mount portion(s) 1006 of the frame member 902. In some embodiments, an annular backbone member 904, a rolling element 906B, and a wheel 908 are all mounted on each mount portion 1006 of the frame member 902. In the illustrated embodiments, when the backbone member 904 is mounted on the mount portion 1006, the backbone member 904 is carried against, but is not joined to (e.g., is not bonded to), the mount portion 1006. In some embodiments of this nature, the backbone member is free to rotate relative to the mount portion. In some cases, the annular backbone member 904 comprises a metal, and the mount portion 1006 comprises a polymer.

Thus, three components preferably are mounted on the mount portion 1006 in the following sequence, moving radially outward from the mount portion: the annular backbone member 904, the rolling element 906B, and the wheel 908. In such embodiments, the backbone member 904 is located radially between the mount portion 1006 and the rolling element 906B, and the rolling element 906B is located radially between the backbone member 904 and the wheel 908.

Figure 15:
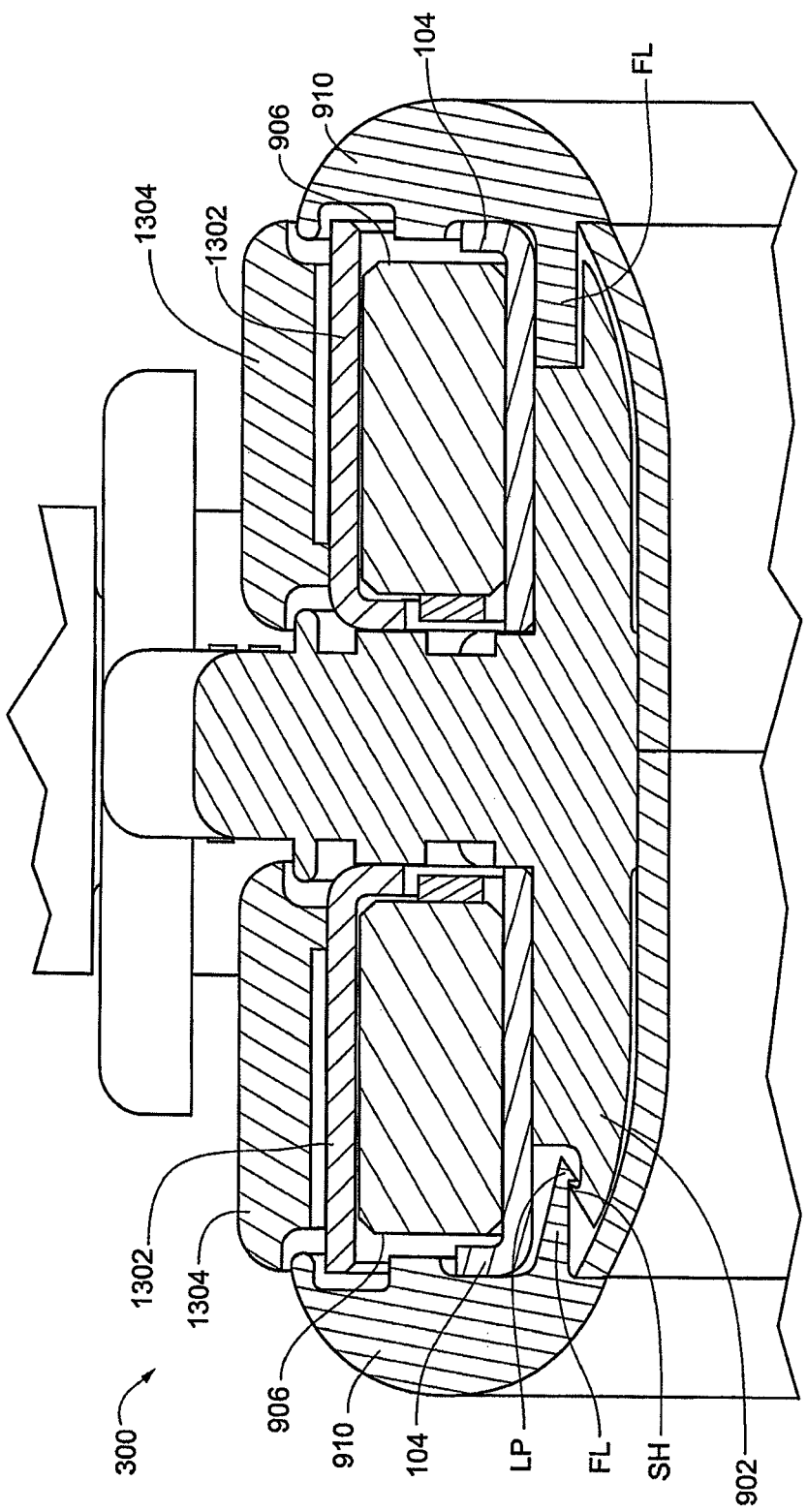
FIG. 15 is a cross-sectional view of an end cap snap-fitted onto a mount portion of a caster frame according to certain embodiments of the present invention.
Figure 16:
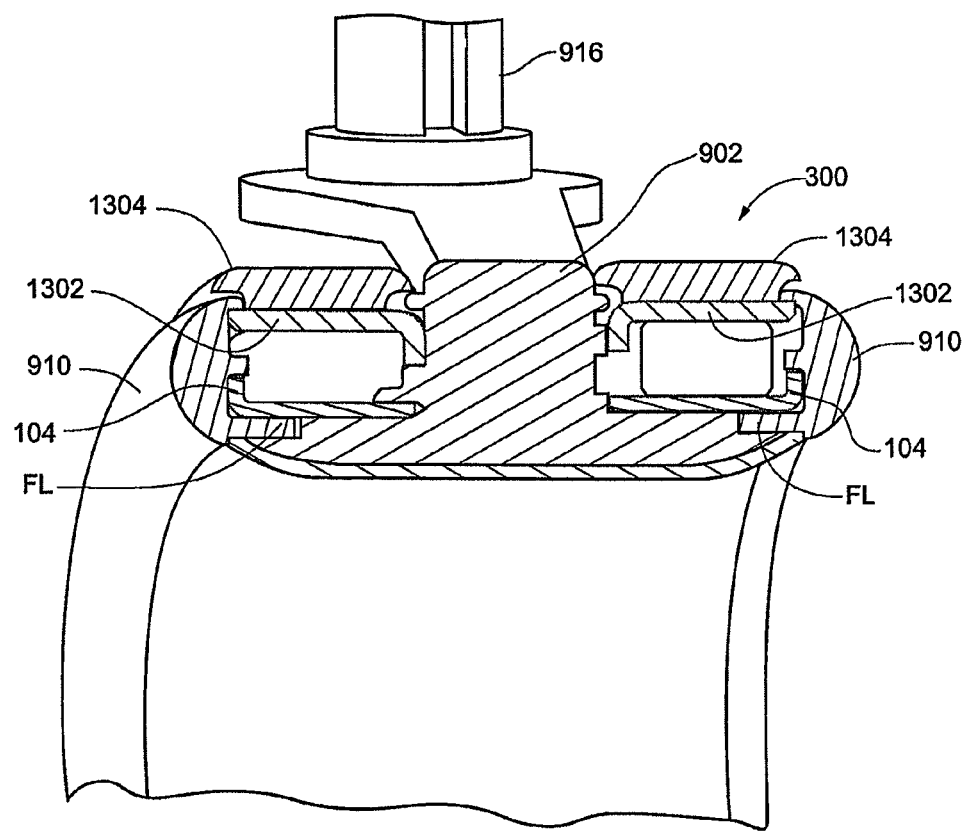
FIG. 16 is a cutaway view of a hubless caster according to some embodiments of the present invention wherein an end cap is ultrasonically welded to a mount portion of a caster frame.

In some embodiments, the hubless caster 300 is provided with an end cap 910 for each mount portion 1006. One exemplary end cap design is shown in FIG. 9. Here, each end cap 910 is configured to be joined to a corresponding mount portion 1006 of the frame member 902, e.g., so as to retain each annular backbone member 904, rolling element 906B, and wheel 908 on the frame member. Each end cap 910 optionally remains in a non-rotating configuration even when the corresponding wheel 908 of the hubless caster 300 is rotating. In such embodiments, the wheel 908 can rotate relative to both the end cap 910 and the frame member 902. In some embodiments, the mount portion(s) 1006 and the end cap(s) 910 each comprise a polymer, and an ultrasonic weld joins the end cap(s) 910 to the corresponding mount portion(s) 1006. FIG. 16 shows one such embodiment wherein flanges of polymer end caps 910 are in contact with polymer mount portions 1006, such that the illustrated caster 300 can be placed in an ultrasonic environment to join these parts (e.g., by providing an ultrasonic weld) where they are in polymer-to-polymer contact with one another. In other embodiments, the end cap(s) 910 are snap-fitted onto the corresponding mount portion(s) 1006. FIG. 15 shows one such embodiment wherein at least one detent LP of the end cap cooperates with a detent SH of the corresponding mount portion so as to snap-fit the end cap onto the mount portion.

Here, the end cap 910 seen on the left in FIG. 15 has a flange FL that defines a lip LP adapted to snap-fit onto the corresponding mount portion when the lip LP engages a shoulder SH of the mount portion. Many other snap-fit options will be apparent to skilled artisans given the present teaching as a guide. In some embodiments where an end cap is snap-fitted onto a corresponding mount portion, the snap-fit is irreversible, such that the only way to remove the end cap 910 is to break an end cap detent, a mount portion detent, or both. As another alternative, the end cap can be joined adhesively to the mount portion. As still another alternative, there can be a threaded connection of an end cap and the corresponding mount portion.

Referring again to FIG. 9, the hubless caster can optionally have a labyrinth seal. When provided, the labyrinth seal creates a torturous path for dirt, liquid, and other contaminants to travel before they can reach and interfere with the rolling element. Thus, one group of embodiments provides a hubless caster having a labyrinth seal. In this group of embodiments, the hubless caster can have any configuration shown or described herein. However, the present embodiment group extends to any other hubless caster design that is provided with a labyrinth seal.

The illustrated hubless caster is provided with an optional flat bottom portion FLP (see FIGS. 10B and 10D) adjacent to which there is at least one drainage port from which fluid or other contaminants can escape from the caster (e.g., due to gravity forcing the fluid downwardly toward, and out of, the drainage port). In the illustrated design, each roller assembly 914 is provided with its own drainage port DRP (see FIG. 7). Thus, one group of embodiments provides a hubless caster comprising a frame member (e.g., a central frame member) having a bottom portion provided with (or adjacent to which there is) at least one drainage port configured to allow liquid inside the caster to escape from the caster. In this embodiment group, the hubless caster can have any configuration shown or described herein. However, the present embodiments extend to any other hubless caster design provided with at least one such drainage port.

Figure 14:
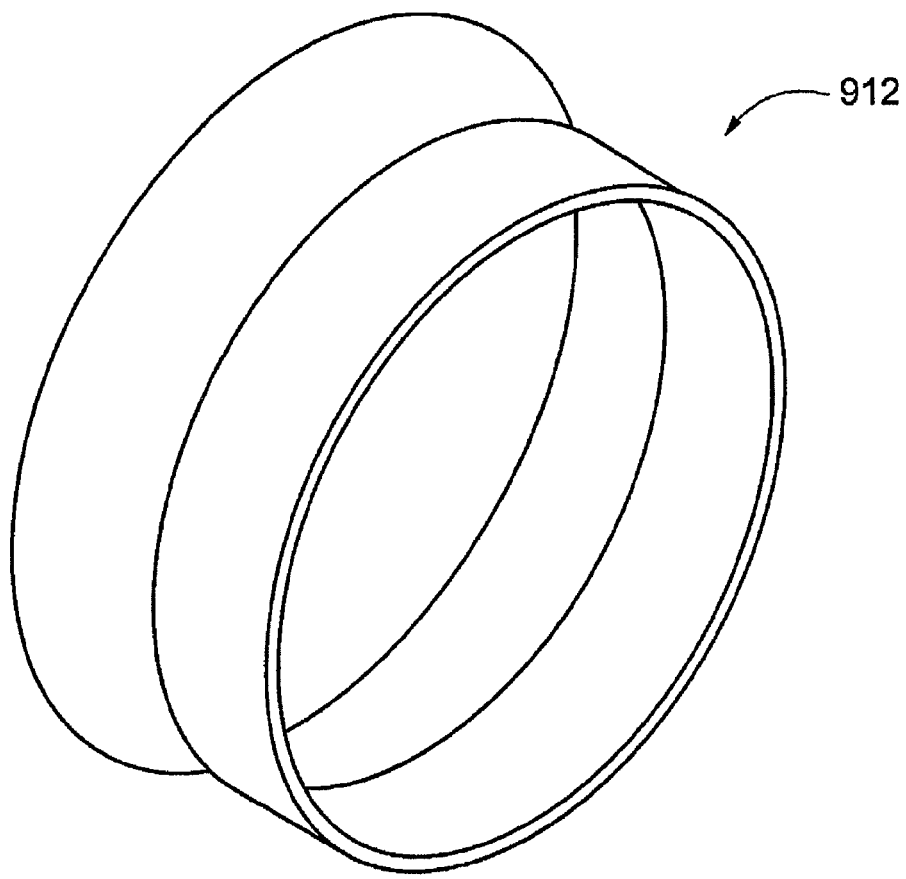
FIG. 14 is a perspective view of a liner ring according to an embodiment of the present invention.

Referring again to FIGS. 3, 9, and 10A-10D, in some embodiments, the hubless caster 300 includes a liner ring 912 for each mount portion 1006. The liner ring(s) 912 can be nested within a central opening 304 of the hubless caster 300. The end cap(s) 910 can optionally retain the liner ring(s) 912 on the hubless caster 300. In embodiments where the frame member 902 and the mount portion(s) 1006 are defined by a single body, the end cap(s) 910 can retain the liner ring(s) 912 against a generally cylindrical interior wall defined by the single body. An illustrative liner ring 912 is shown in FIG. 14. Liner rings 912 can enhance the appearance of the hubless caster 300. In some embodiments, the liner rings 912 are made of aluminum, plastic, wood, or another decorative material. When provided, the liner rings can have virtually any desired color, luster, and/or other decorative properties. The liner rings (or "insert rings") can be made, for example, by stamping, machining, or molding.

The various components of the hubless caster 300 cooperate to allow a chair or any other article supported by the hubless caster 300 to roll. As noted above, the hubless roller assemblies 914 include an annular backbone member 904, a rolling element 906B, and an outer wheel 908, with the rolling element 906B being positioned radially outwardly of the backbone member 904 and the wheel 908 being positioned radially outwardly of the rolling element 906B. The rollers 920 of the rolling element 906B rotate freely within the roller receptacles 918. As the outer wheel 908 rolls on a surface (e.g., the floor), the wheel exerts a tangential force on the rollers, causing the rollers 920 to roll along the outer surface 1104 of the backbone member 904. The backbone member 904 defines an inner bearing race (or "inner raceway"). Thus, the illustrated rollers 920 are adapted to roll against the annular backbone member 904, rather than the rolling against a mount portion 1006 of the caster frame. This configuration is advantageous in that it can provide a highly durable caster, it can prevent the mount portion 1006 from wearing prematurely, or both. In the illustrated embodiments, the wheel 908 defines an outer bearing race (or "outer raceway"). Thus, the rollers 920 are adapted to roll between the inner bearing race and the outer bearing race. In certain embodiments, both bearing races are defined by metal surfaces. In other embodiments, the inner race (which is a primary wear component) is defined by a metal surface, while the outer race is defined by a polymer surface. The wheel 908, for example, can alternatively be a single ring comprising a polymer.

In some embodiments, the backbone member 904, the rolling element 906B, and the wheel 908 have a force-distributing assembly configuration. The force-distributing assembly configuration can be characterized by the backbone member 904, the rolling element 906B, and the wheel 908 all having substantially the same width. In this way, force transferred between the wheel 908 and the backbone member 904 is distributed over substantially the entire width of the rolling element 906B. This broad distribution of force can reduce the likelihood of the hubless caster 300 wearing unevenly, increase the load rating of the caster, and/or improve the overall performance of the caster. In some embodiments of this nature, the rolling element 906B comprises a plurality of cylindrical rollers 920 each having a cylinder length (extending parallel to the wheel's axis of rotation) that is substantially the same as the widths of the backbone member and the wheel.

One way to characterize the configuration of a hubless caster 300 is by its profile ratio. FIG. 5 shows a hubless roller assembly 914 of the hubless caster 300. The roller assembly 914 has an outer wheel radius OWR and a radial thickness RT. Here, the outer wheel radius OWR corresponds to the radius of the outer surface (or "tread surface") of the exterior ring (1304 in FIG. 13). This outer surface is the surface that would contact the floor or ground. In many embodiments, the radial thickness RT corresponds to the difference between the outer wheel radius OWR and the minimum interior radius of the frame member or any liner ring. The ratio of radial thickness RT to outer wheel radius OWR is referred to as the profile ratio of the hubless caster 300. Generally speaking, a hubless caster 300 with a low profile ratio is considered a low profile hubless caster 300.

Due to the improved design of the present hubless caster, it can provide a surprising degree of durability even though it has a very low profile. In some embodiments, the radial thickness RT of the hubless roller assembly 914 is less than half as great as the outer wheel radius OWR, such that the hubless caster 300 has a profile ratio of less than 0.5. In certain embodiments, the profile ratio of the hubless caster 300 is even lower, such as less than 0.45, less than 0.4, less than 0.35, less than 0.3, less than 0.25, or less than 0.2. In some embodiments, even though the hubless caster has a profile ratio within any one or more of these ranges, the dynamic load rating of the hubless caster 300 is at least 90 pounds. In some embodiments, the dynamic load rating is even greater, such as at least 93 pounds, at least 100 pounds, at least 150 pounds, at least 200 pounds, at least 300 pounds, at least 400 pounds, or at least 500 pounds, or at least 600 pounds. In some embodiments, the hubless caster has a profile ratio of less than 0.5, or even less than 0.4, and yet the hubless caster has a dynamic load rating of at least 150 pounds. In some heavier duty embodiments, the hubless caster has a profile ratio of less than 0.5, or even less than 0.4, and yet the hubless caster has a dynamic load rating of at least 200 pounds. In some particularly heavy duty embodiments, the hubless caster has a profile ratio of less than 0.5, or even less than 0.4, and yet the hubless caster has a dynamic load rating of at least 400 pounds, or even at least 500 pounds.

The dynamic load ratings reported herein are in accordance with the North American Performance Standards for Casters and Wheels (ICWM 2004), Section 7.8.1, the contents of which are incorporated herein by reference. Briefly, the test establishes the operational load capacity for casters at or under 2.5 mph by determining the maximum load that can be carried during operation with no functional impairment to the caster. Upon completion of the test, the acceptance criteria are that the swivel and wheel bearing shall rotate freely and the parts shall be free from defects which can impair caster function.

Different embodiments of the present caster meet various other performance criteria. Some embodiments produce a minimal amount of noise during operation. In some embodiments of this nature, the caster is devoid of plastic parts in dynamic contact with (e.g., rubbing against, or configured to rub against during rolling of the caster) other plastic parts. In certain embodiments of this nature, each mount portion comprises (or consists essentially of) a polymer, the backbone member comprises (or consists essentially of) a metal, the rollers of the rolling element comprise (or consist essentially of) a polymer, and the wheel has a metal surface defining the outer bearing race. Some embodiments provide self-braking (and/or a resistance to being moved inadvertently), such that a chair equipped with the present hubless casters requires a significant force, such as at least 12 Newtons, to move the chair from a stationary position. The design of the present caster is advantageous in that it can exhibit particularly good self-braking performance without requiring a separate braking mechanism. In such embodiments, the hubless roller assembly 914 can be provided with a lubricant having a viscosity sufficient to achieve the desired self-braking functionality.

Figure 17:
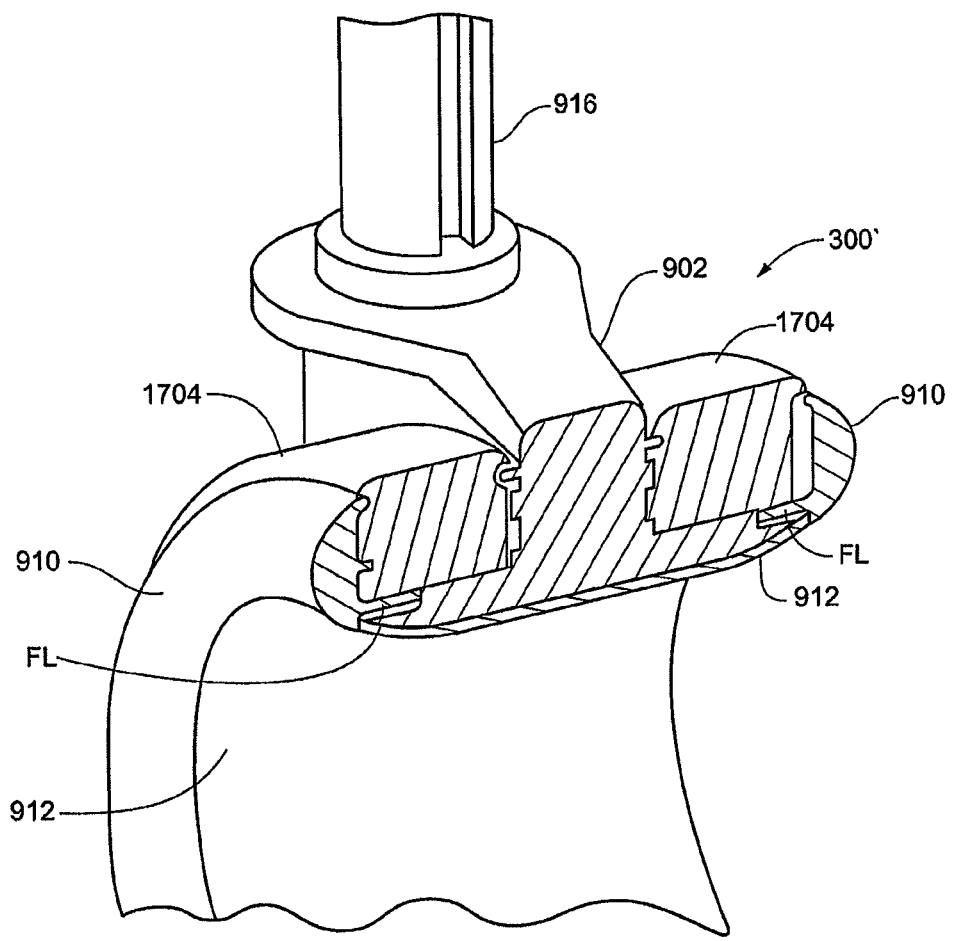
FIG. 17 is a cutaway view of a hubless caster according to embodiments of the present invention wherein a low friction ring is used as a wheel and the caster is devoid of any ball bearings or roller bearings.

FIG. 17 shows an embodiment wherein the hubless caster 1700 is devoid of ball bearings and roller bearings. Instead of providing such conventional bearings, the present design has a low friction ring defining a wheel that simply slides in a channel of the caster. Here, the caster 1700 has a two-wheel configuration, including two wheels 1702, 1704 and two corresponding mount portions 1706, 1708. However, a single-wheel design can also be used. The interface of the outer wheels 1702, 1704 and the corresponding mount portions 1706, 1708 is formed by materials having low coefficients of friction, thereby allowing the wheels 1702, 1704 to rotate freely relative to the mount portions 1706, 1708.

Figure 19:
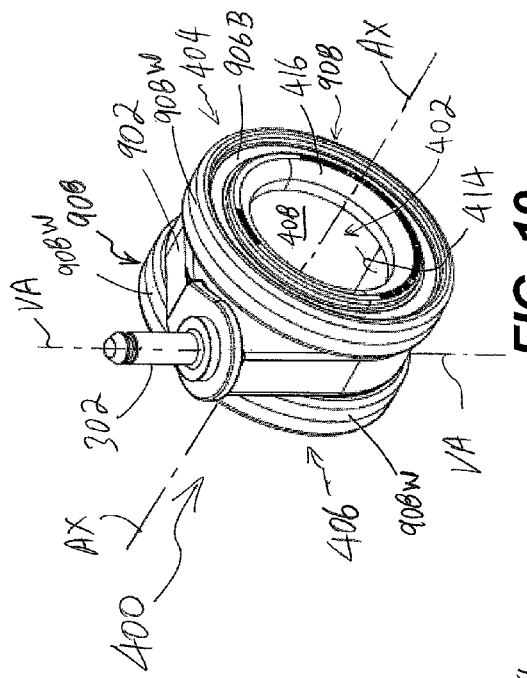
FIG. 19 is a perspective view of a hubless caster according to an embodiment of the invention.
Figure 20:
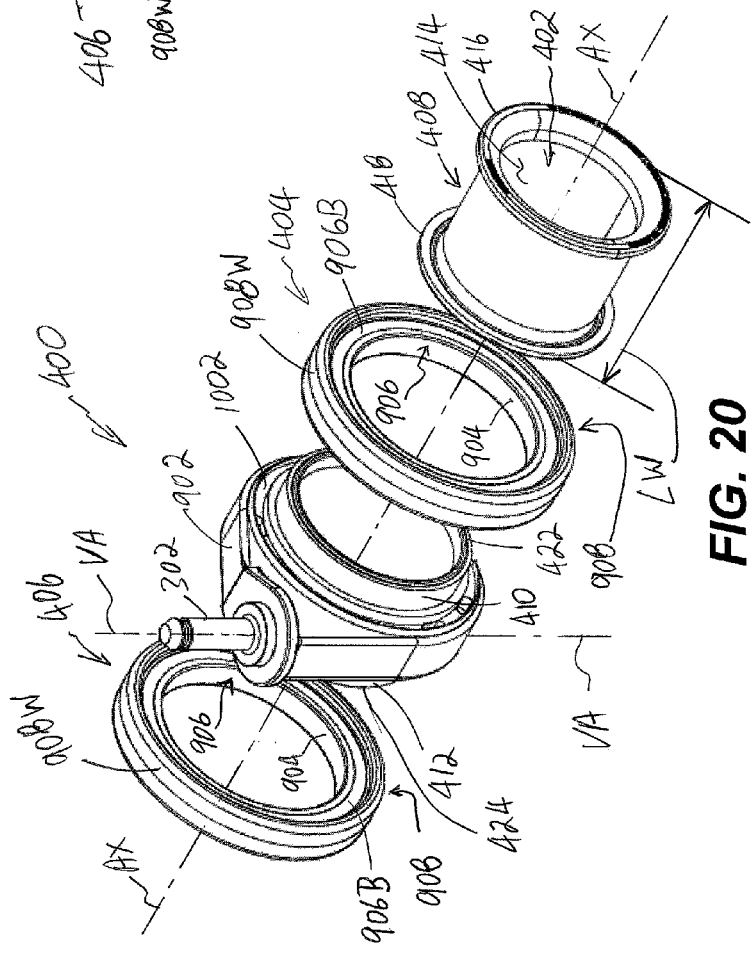
FIG. 20 is an exploded perspective view of the hubless caster of FIG. 19.
Figure 27:
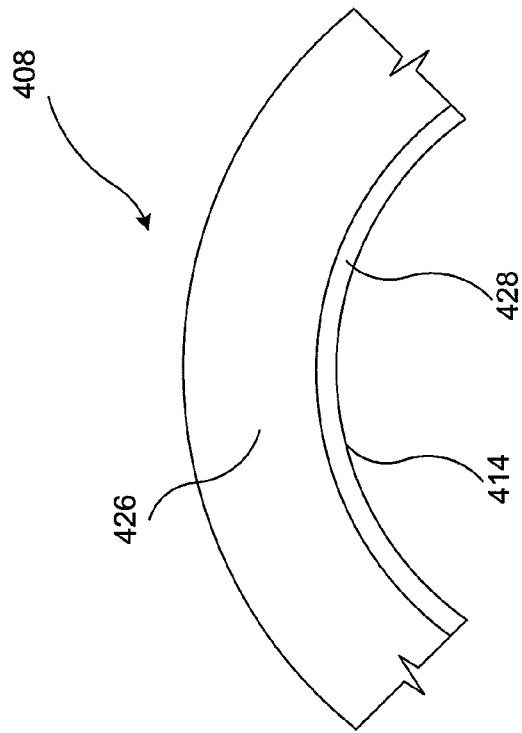
FIG. 27 is a broken-away schematic cross-sectional view of a thin film molded retention wall for a hubless caster in accordance with certain embodiments of the invention.
Figure 26:
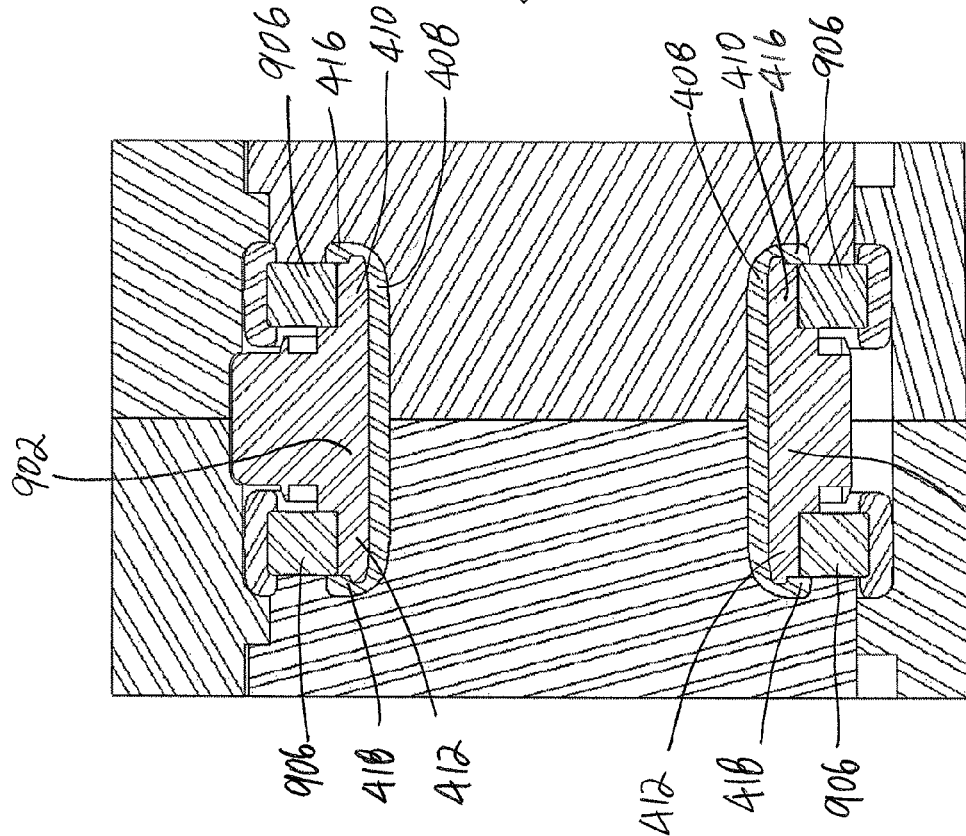
FIG. 26 is a cross-sectional view of a molding tool being used to mold a retention wall on a hubless caster subassembly in accordance with certain embodiments of the invention.

FIGS. 19-22 illustrate the various views of hubless caster 400 according to an embodiment of the invention; wherein, FIG. 19 shows a perspective view of hubless caster 400, FIG. 20 is an exploded view of hubless caster 400, FIG. 21 is a schematic cross-sectional view of caster 400, and FIG. 22 is a schematic cross-sectional view taken along lines D-D of FIG. 21. Further, FIG. 23 is a schematic front view of a frame member for a hubless caster according to certain embodiments of the invention, FIG. 24A is a side view of an exemplary wheel/bearing assembly 404/406 in accordance with certain embodiments, FIG. 24B is a cross-sectional view of the wheel/bearing assembly 404/406 of FIG. 24A taken along lines R-R, FIG. 25 is a perspective view of a hubless caster having a retention wall comprising a thin film molded layer according to certain embodiments, FIG. 26 is a cross-sectional view of a molding tool being used to mold a retention wall onto a hubless caster subassembly according to certain embodiments, and FIG. 27 is a broken-away schematic cross-sectional view of a thin film molded retention wall for a hubless caster in accordance with certain embodiments of the invention.

In the embodiment shown, hubless caster 400 includes open central corridor (or "central opening") 402, vertical pin (or caster stem) 302, caster frame member 902, first and second wheel/bearing assemblies 404 and 406, respectively, and retention wall 408. While hubless caster 400 is illustrated as having a twin-wheel design (e.g., having two wheel/bearing assemblies 404 and 406), alternate embodiments have a single-wheel design (i.e., having only one wheel/bearing assembly 404).

As shown, open central corridor 402 is bounded (e.g., defined, at least in part, and preferably entirely) by retention wall 408 and is located where a hub would be located in a conventional hubbed caster. The illustrated central corridor 402 is generally cylindrical, having a central (or longitudinal) axis AX, which during use will preferably be generally or substantially parallel to the surface on which the hubless caster 400 rolls. Thus, on the central axis AX of caster 400, there is no solid material, instead there is just open space. In some embodiments, the central corridor 402 has a diameter of greater than 1 inch, greater than 1¼ inch, or even greater than 1½ inch. These dimensions, however, are by no means limiting. While central corridor 402 is shown as having a constant circular cross-section along its longitudinal extent, this need not always be the case. For instance, central corridor 402 can have a cross-section that is square, rectangular, polygon, elliptical, etc. Also, the cross-section may vary in moving along the longitudinal direction.

The hubless caster preferably has a vertical axis VA about which the caster frame 902 is configured to swivel. The vertical axis VA will commonly be perpendicular to the noted central axis AX (about which the wheel(s) rotate(s)). In the embodiment illustrated, hubless caster 400 includes caster stem (or vertical pin) 302 attached to frame member 902 and defining a vertical axis VA about which hubless caster 400 is configured to swivel. Thus, stem 302 can be attached to the leg of a chair or another rollable article so as to permit swivel (or rotatable) movement of caster frame 902 about the vertical axis VA. In such embodiments, the stem 302 preferably is configured to be removably attached to the chair or other rollable article. If so desired, stem 302 and frame 902 could be an integral one-piece structure. In such embodiments, stem 302 is configured to be rotatably attached to the rollable article so as to permit swivel (or rotational) movement of the stem 302 and frame 902 as a single unit about the vertical axis. The caster 400 need not always use a caster stem for attachment to the chair or other rollable article; other means of attaching caster 400 to the rollable article will be apparent to one skilled in the art and are considered to be within the metes and bounds of the invention.

As described above with reference to FIGS. 10A-10D, the illustrated frame member 902 preferably includes two opposed sides 1002 and 1004 and comprises first and second opposed annular mount portions 410 and 412 (which can be like mount portions 1006 in FIGS. 10A-10D). The annular mount portion(s) can be integral to the frame member, or the mount portion(s) can be formed by one or more bodies separate from (but attached to or mounted within) the frame member. In the embodiments shown, the annular mount portions 410, 412 are defined, at least in part (e.g., entirely), by respective ring-shaped walls projecting transversely outward and away from sides 1002 and 1004 of the frame member 902. The illustrated mount portions 410 and 412 have opposed transverse sides defined by rims (or edges) 422 and 424 of the ring-shaped walls.

As described below, each of the first and second mount portions 410 and 412 is configured for receiving (and mounting on an outer surface thereof) one of the wheel/bearing assemblies 404 and 406. In some embodiments of hubless caster 400, the ring-shaped wall of each mount portion 410 and 412 has an outwardly flared configuration wherein an outer extent of each ring-shaped wall has an outside diameter that is larger than that of an inner extent of the ring-shaped wall. Here, the "outer extent" is further from the frame member than is the "inner extent." Reference is made to FIG. 23, which is a schematic side view exaggerating for illustration purposes the optional outward taper of each annular mount portion 410, 412. This configuration can provide particularly stable seating of the annular backbone member on the annular mount portion. It is to be appreciated that the outwardly flared configuration noted above can be used on the single annular mount portion of a single-wheel hubless caster embodiment.

In the interest of brevity, more detailed description of the frame member and annular mount portions is not repeated here; instead, reference is made to the discussion of those elements above, e.g., with reference to FIGS. 10A-10D.

Although not a requirement, the illustrated first and second wheel/bearing assemblies 404 and 406 are of identical construction. Thus, while only one wheel/bearing assembly may be described at times in the present disclosure, descriptions concerning one wheel/bearing assembly may apply equally well to the other. Moreover, as already explained, single wheel embodiments would only have one such wheel/bearing assembly 404.

Preferably, each wheel 908 is substantially ring-shaped and configured to rotate about the central axis AX (e.g., relative to retention wall 408 and mount portions 410 and 412). More will be said of this later.

The illustrated wheel/bearing assembly configuration involves a bearing 906 comprising, moving radially outwardly, an annular backbone member 904 (or "inner ring," which defines the inner race of the bearing), a rolling element 906B comprising a plurality of ball bearings, roller bearings or the like 920, and an outer race portion 908R (or "outer ring," which defines the outer race of the bearing).

In some embodiments of hubless caster 400, annular backbone member 904, rolling element 906B, and wheel 908 are part of a unitary bearing. For example, each bearing can optionally be a sealed bearing, such that the ball bearings, roller bearings or the like 920 are housed inside a sealed enclosure bounded by the inner and outer races. Reference is made to FIGS. 24A and 24B.

The bearing 906 mounted on each annular mount portion can be a radial thin section bearing. One suitable commercially available bearing is the 6810-2RS Radial Thin Section Ball Bearing manufactured by VXB Ball Bearings of Anaheim, Calif., USA. Other suitable commercially available bearings can be obtained from SST Bearings of Loveland, Ohio, USA.

Thus, each illustrated wheel/bearing assembly 404, 406 includes an annular backbone member (or "inner race member") 904 mated together with an outer race member 908R, such that these mated race members are rotatable relative to each other due to the rolling element 906B (which comprises ball bearings, roller bearings or the like 920) being provided there between.

Each annular backbone member 904 is configured for being received by (e.g., mounted on) the outer surface of one of the annular mount portions 410, 412. In the illustrated embodiment, the preferred manner in which the annular backbone member 904 is mounted on the annular mount portion is characterized by the backbone member being a larger diameter ring snugly nested concentrically around the smaller diameter ring-like mount portion.

In the illustrated dual-wheel embodiment, the first and second wheel/bearing assemblies 404 and 406 are spaced apart along an axis parallel to the central axis AX such that the central frame member 902 (or at least a portion of it) is located between the two wheel/bearing assemblies 404 and 406.

Preferably, the backbone member 904 is located radially between the annular mount portion 410, 412 and the rolling element 906B (which comprises ball bearings, roller bearings or the like 920), and the rolling element is located radially between the backbone member 904 and the wheel 908. In the illustrated embodiments, the wheel 908 comprises a wheel portion (or "tire portion") 908W molded to an outer race portion 908R. This, however, is not required. For example, the wheel 908 can alternatively be a single integral body that defines both the wheel portion 908W and the outer race portion 908R.

In the embodiment illustrated, a wheel/bearing assembly 404, 406 is mounted on each annular mount portion 410, 412. Preferably, the wheel/bearing assemblies 404 and 406 and the annular mount portions 410 and 412 are configured to provide a snug fit between an inner surface of each backbone member 904 and an outer surface of the corresponding annular mount portion. Thus, during rotation of the wheel(s) 908 (e.g., when the hubless caster 400 is rolling), each annular backbone member 904 remains rotationally stationary, as do the frame member and annular mount portion(s).

Due to the bearings 906, the illustrated wheels 908 are rotatable about the central axis AX of the hubless caster 400 relative to the rotationally stationary mount portions 410, 412 and backbone members 904.

In certain preferred embodiments, the retention wall 408 is molded to the frame member 902 and annular mount portion(s) 410, 412 so as to form a unitary component. In the embodiment illustrated in FIGS. 19-22 and 25, the retention wall 408 extends longitudinally along and around both transverse sides of the annular mount portions 410 and 412. Preferably, the central corridor 402 is defined by a radially-inwardly-oriented facing surface 414 of the retention wall 408, which preferably is exposed to the central corridor.

In some embodiments, the retention wall 408 is a single integral wall (optionally consisting of a single body) defining first and second opposed retainer lips 416, 418 and a central span 420 extending between the two retainer lips 416, 418. Preferably, the central span 420 extends substantially parallel to the central axis AX. In the embodiment illustrated, each retainer lip 416 and 418 flares radially outward from the central span 420 and extends past (or beyond, e.g., so as to wrap around) the outer rim (or edge) 422, 424 of the corresponding annular mount portion 410, 412. Thus, the illustrated retainer lips 416 and 418 each terminate in a radially extending flange that is substantially perpendicular to the hubless caster's central axis AX (and in some embodiments, to the central span 420 of the retention wall 408). Preferably, the retention wall 408 is a molded wall, as discussed below in further detail.

In some cases, the lateral distance between the opposed transverse sides of the annular mount portions 410 and 412 (i.e., the distance between the two opposed rims/edges 422 and 424) is at least 75%, at least 80%, or at least 90% as great as the lateral width LW of the retention wall 408. This is perhaps best appreciated in FIG. 21.

As shown schematically in FIG. 22, moving radially inward towards the central axis AX of the central corridor 402, the illustrated embodiment of hubless caster 400 sequentially includes wheel 908, rolling element 906B (which is shown schematically in cross section as a solid ring in FIGS. 21 and 22; although not shown in these two figures, the rolling element 906B preferably comprises a plurality of ball bearings, roller bearings or the like 920), backbone member 904, mount portion 410, 412, and retention wall 408.

In the embodiment illustrated in FIGS. 19-22, the first and second retainer lips 416, 418 are respectively configured for embracing (and embrace, e.g., bear against) first and second wheel/bearing assemblies 404, 406. Preferably, retainer lips 416 and 418 respectively embrace the first and second annular backbone members 904 of first and second wheel/bearing assemblies 404 and 406. In this manner, the first and second wheel/bearing assemblies 404 and 406 are held (or "retained") on the respective first and second annular mount portions 410 and 412 by virtue of each wheel/bearing assembly being sandwiched between (optionally directly between, i.e., with nothing separating them) the frame member 902 and the corresponding retainer lip 416, 418 (optionally such that a side of the bearing, and preferably a side edge of the annular backbone member thereof, contacts a side of the frame member 902 while the corresponding side of the wheel is spaced apart from the frame member). In the illustrated embodiment, the retention lips 416, 418 are in direct contact with the respective annular backbone members 904. This, however, is not required. For example, the retainer lips 416, 418 could serve their retaining function even if one or more other components were sandwiched between the retainer lip and the backbone member.

When first and second wheel/bearing assemblies 404 and 406 are respectively received by (and mounted on) first and second annular mount portions 410 and 412, a snug (optionally tight) press fit preferably is formed between the inside surface of each annular backbone member 904 and the outside surface of the annular mount portion 410, 412 on which it is mounted. As such, the illustrated retention wall 408, annular mount portions 410 and 412, and backbone members 904 are locked together to form a rotationally stationary unit relative to the wheels 908, which by virtue of the rolling elements 906B are rotatable about the central axis AX of hubless caster 400. Thus, the illustrated retention wall 408, lips 416 and 418, mount portions 410 and 412, and backbone members 904 are all held in a rotationally stationary position while the rolling elements 906B and wheels 908 are free to rotate about the caster's central axis AX.

In some embodiments of hubless caster 400, the retention wall 408 comprises (or consists of) a low molding shrink polymer having a shrink factor of less than 6%, less than 2.5%, less than 1%, or less than 0.7%. More will be said of this later. Suitable low molding shrink polymers include ABS plastic and polycarbonate. As just one example, a general purpose ABS sold commercially as Amcel KP20 can be used. As another example, a general purpose polycarbonate sold commercially as Lexan can be used. Colorants can be added, if desired.

In some embodiments, each wheel 908 comprises (or consists of) a plastic having a durometer of greater than 50, greater than 51, or greater than 52. In certain preferred embodiments, a medium durometer is used, such as a durometer of about 50-70, or about 55-65, such as about 60. This refers to the Shore D durometer scale. One suitable plastic is a urethane.

Preferably, the backbone member 904 comprises (or consists of) a metal, such as steel. Likewise, it is preferably that the bearing's outer ring, when provided, comprise (or consist of) a metal, such as steel. In some embodiments (such as those requiring less durability, or where a particularly durable plastic is used), it may be acceptable to provide the backbone member 904, the outer ring 908R of the bearing, or both as plastic components. In many cases, though, it will be preferred that both comprise (or consist of) metal.

In certain preferred embodiments, each wheel 908 comprises an outer wheel portion 908W molded over an outer race portion 908R of a bearing 906 such that the molded wheel portion extends around the outer race portion (which preferably is defined by an outer ring of the bearing) so as to embrace both opposed transverse sides of the outer race portion. This is perhaps best appreciated with reference to FIGS. 21 and 24B. In these embodiments, the wheel portion 908W of each wheel 908 preferably comprises (or consists of) plastic, such as urethane, while the outer race portion 908R comprises (or consists of) metal, such as steel.

The hubless caster 400 can provide a number of advantages. It can, for example, provide an exceptionally durable caster. The dynamic load rating of the hubless caster can be much greater than those of many conventional casters. For example, hubless caster 400 can have a dynamic load rating of greater than 200 pounds, such as in the range of about 275-350 pounds. Moreover, this load rating can be obtained when the hubless caster 400 has a profile ratio of less than 0.5. More generally, hubless caster 400 can have any combination of dynamic load rating and profile ratio discussed in this paragraph or in the preceding paragraphs addressing load rating and/or profile ratio.

The weight of the hubless caster can be particularly low. In certain embodiments, the hubless caster weighs less than 0.7 pound, less than 0.6 pound, or even less than 0.5 pound, such as about 0.48 pound. These embodiments, while involving a lightweight caster, can provide a dynamic load rating within any one or more of the ranges noted above, even at the profile ratios noted above.

Further, hubless caster 400 can provide an extremely smooth, quiet roll. Further yet, its configuration enables particularly efficient, reliable manufacturing and assembly. Still further, the caster can be particularly advantageous for applications in which it is desirable that the caster stay clean or hygienic. Many conventional casters have open gaps, slots, blind openings, or the like in which dirt, contaminants, or other debris can be housed. In various clean-room-type environments, such as medical areas, it would be desirable to use sealed casters with no axles. Thus, in certain embodiments (optionally in any embodiment of the present disclosure), the hubless caster can be a sealed caster, which is devoid (other than potentially having small drainage ports at the bottom of the caster), at least, of open perimeter slots (and preferably of any other openings) providing debris access to an interior cavity of the caster.

The invention also provides methods for manufacturing a hubless caster having an open central corridor. In the present embodiments, the method involves providing a subassembly that includes a frame member 902 comprising an annular mount portion 410, 412 on which a wheel/bearing assembly 404, 406 is mounted. Reference is made to FIG. 20, where the hubless caster is a dual-wheel embodiment having two wheel/bearing assemblies 404 and 406. As already explained, the hubless caster can alternatively have a single-wheel design, in which case it would have only one wheel/bearing assembly 404.

In the exemplary embodiment shown in FIG. 20, each wheel 908 comprises a wheel portion 908W molded onto the outer ring (or "outer race portion") 908R of a bearing 906, so as to form a wheel/bearing assembly. This is perhaps best appreciated with reference to FIG. 24B. In one non-limiting working example, this molding operation is done by inserting the bearing 906 into a tool that over-molds a polymer (e.g., urethane) wheel portion (or "tire portion") 908W around an outer diameter of the bearing's outer ring 908R, thus wrapping the molded polymer symmetrically around both sides of the bearing's outer ring. This can advantageously reduce the potential for improper orientation in subsequent assembly steps. These details, however, are by no means strictly required. For example, in alternate embodiments, a single integral body can define both the wheel portion 908W and the race portion 908R.

In the present method, each wheel/bearing assembly 404, 406 is mounted on an annular mount portion 410, 412 of the frame member 902. As can be appreciated, e.g., with reference to the embodiment of FIG. 20, the first wheel/bearing assembly 404 is moved (e.g., slid) axially onto the first annular mount portion 410, and the second wheel/bearing assembly 406 is moved (e.g., slid) axially onto the second annular mount portion 412.

The method then involves over-molding a retention wall 408 onto the subassembly (which comprises the frame member with a wheel/bearing assembly on each annular mount portion) so as to secure each wheel/bearing assembly 404, 406 between the frame member 902 and a retainer lip 416, 418 of the molded retention wall. The resulting retention wall 408 is located radially inward of the frame member 902 and annular mount portion(s) 410, 412. Preferably, the retention wall 408 defines a radially-inwardly-oriented facing surface 414, which is exposed to the caster's open central corridor 402. In one non-limiting working example, the molder inserts the noted subassembly into a molding tool. Reference is made to FIG. 26. A central hub (i.e., the retention wall 408) is molded inside an inner diameter of the frame 902, and wraps around the inner ring (or "annular backbone member") of the bearing 906, thereby creating on each side of the caster 400 a permanent retainer lip 416, 418 that holds each bearing on its annular mount portion 410, 412 and also locks each bearing against the caster frame so as to keep the bearing(s) in the correct position and free of axial play.

In certain preferred embodiments, the over-molding operation involves forming the retention wall 408 by a molding process using a low molding shrink polymer having a shrink factor of less than 6%, preferably less than 2.5%, more preferably less than 1%, and further preferably less than 0.7%. It has been discovered that if a high shrink factor polymer is used, then when the newly molded polymer is bonded inside the mount portion(s), the shrinkage that subsequently occurs can actually deform the mount portion(s). Specifically, it can pull the annular mount wall inwardly somewhat, so as to slightly reduce the outside diameter of the mount portion. This can result in a less than snug fit between the annular backbone member and the annular mount portion on which it is mounted. The shrink factor (or "shrink value") is the shrinkage, expressed as a percentage, that a molded body experiences in cooling from the higher molding/processing temperature to room temperature.

Thus, in certain preferred embodiments of the present invention, the retention wall 408 is molded using a low molding shrink polymer having a shrink factor of less than 6%, less than 2.5%, less than 1%, or less than 0.7%. Suitable low molding shrink polymers include ABS plastic and polycarbonate.

In some of the present embodiments, the frame member 902 and annular mount portion(s) 410, 412 comprise plastic, and the over-molding operation involves molding polymer so as to bond the resulting retention wall 408 directly to the plastic frame member and annular mount portion(s). In some of these embodiments, the retention wall 408 is formed of (e.g., consists of) a different polymer than the frame member and annular mount portion(s). The retention wall, for example, can be formed of (e.g., can consist of) a polymer having a lesser molding shrink factor than the polymer forming the frame member and annular mount portion(s). In one non-limiting working example, ABS plastic is used to form the retention wall, and acetal is used to form the frame member and annular mount portion(s).

Referring to FIGS. 24A and 24B, the wheel 908 optionally comprises a plastic wheel portion 908W and a metal race portion (e.g., an outer ring of the bearing) 908R. When provided, the metal race portion 908R can advantageously define an outer race of the bearing, while the annular backbone member 904 can advantageously define the inner race of the bearing, such that the ball bearings, roller bearings or the like 920 are located between the inner and outer races of the bearing.

In certain embodiments, the metal outer race portion 908R has opposed transverse sides, and the method comprises molding polymer over the metal outer race portion such that the molded plastic wheel portion 908W extends around the metal race portion so as to embrace both of its transverse sides, thereby locking together the plastic wheel portion and the metal race portion. This is best seen in FIGS. 24A and 24B.

In some cases, the wheel molding is performed using a medium durometer plastic having a durometer of about 50-70, or about 55-65, such as about 60. In preferred embodiments, the polymer material is over-molded at a significant thickness (e.g., at least about 0.03 inch, at least about 0.05 inch, or at least about 0.075 inch, such as about 0.087 inch) around both sides of the thin bearing. This can facilitate using a medium durometer polymer, such as a medium durometer urethane, so the caster is well suited for use on both hard and soft floors. Traditionally, casters are offered in either hard floor or soft floor versions. It is to be appreciated that the present hubless caster is not limited to any particular wheel durometer range.

FIG. 27 is a broken-away schematic cross-sectional view of thin film molded retention wall 408 for hubless caster 400 in accordance with certain embodiments of the invention. As shown, the innermost wall of retention wall 408 is a single integral wall having base layer 426 and second layer 428, and includes a radially inwardly oriented facing surface 414 exposed to central corridor 402. In some embodiments of the invention, second layer 428 is thinner than base layer 426. In certain embodiments of the invention, second layer 428 is substantially thinner than base layer 426. In a non-limiting exemplary embodiment, second layer 428 is a thin film molded layer. For example, second layer 428 can be a thin decorative layer with ornamental designs such as simulated wood grain, flowers, or other aesthetically pleasing designs. The thin film decorative layer can also include logos (e.g., corporate logos), slogans, sports team identifiers, celebrities, cartoons, etc. Decorative layers exhibiting metallic appearance, e.g., chrome, are also contemplated.

In accordance with an embodiment of the invention, second layer 428, e.g., the thin film decorative layer, is molded to (or integrated with) base layer 426 when retention wall 408 is over-molded onto the subassembly of hubless caster 400. In a non-limiting exemplary embodiment, second layer 428 is positioned or formed within the mold prior to injecting or introducing the material, e.g., polymer, used for retention wall 408. As such, the decorative or printed surface of second layer 428 that will be visible through central corridor 402 is positioned or formed facing radially towards where central corridor 402 will be formed.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A hubless caster having an open central corridor and comprising, in sequence moving radially outwardly, a generally cylindrical innermost wall configured as a retention wall, a generally cylindrical mount portion, a bearing, and a wheel, the retention wall defining a radially inwardly oriented facing surface, the retention wall being a single integral wall consisting of a single body, the radially inwardly oriented facing surface being exposed to the hubless caster's central corridor, the generally cylindrical mount portion comprising a ring-shaped wall radially inside of which the generally cylindrical innermost wall is nested concentrically, the bearing being mounted on the generally cylindrical mount portion such that the ring-shaped wall is nested concentrically radially inside the bearing, the retention wall preventing the bearing from moving transversely off the mount portion by virtue of having a retainer lip carried directly against a transverse side of the bearing, the retention wall being molded to the generally cylindrical mount portion such that the retainer lip extends around and embraces, by being in contact with, the transverse side of the bearing.

2. The hubless caster of claim 1, wherein the retainer lip embraces, by being in contact with, a stationary annular backbone member of the bearing, the retainer lip and the annular backbone member remaining rotationally stationary during rotation of the wheel.

3. The hubless caster of claim 1, wherein the retention wall comprises a low molding shrink polymer having a shrink factor of less than 1%.

4. The hubless caster of claim 1, wherein the hubless caster comprises a frame member from which the generally cylindrical mount portion projects transversely outwardly, and the bearing is held on the generally cylindrical mount portion by virtue of being sandwiched directly between the central frame member and the retainer lip.

5. The hubless caster of claim 4, wherein the ring-shaped wall of the generally cylindrical mount portion has outwardly flared configuration in that an outer extent of the ring-shaped wall has a larger exterior diameter than does an inner extent of the ring-shaped wall.

6. The hubless caster of claim 1, wherein the hubless caster is equipped with a vertical pin defining a vertical axis about which the hubless caster is configured to swivel.

7. The hubless caster of claim 1, wherein the wheel comprises a plastic wheel portion and a metal race portion, the metal race portion defining an outer race of the bearing.

8. The hubless caster of claim 7, wherein the metal race portion has opposed transverse sides, and the plastic wheel portion is molded over the metal race portion such that the molded plastic wheel portion extends around the metal race so as to embrace both of its transverse sides, thereby locking together the plastic wheel portion and the metal race portion.

9. The hubless caster of claim 1, wherein the wheel comprises a medium durometer plastic having a Shore D durometer of about 55-65.

10. The hubless caster of claim 1, wherein the hubless caster has two opposed generally cylindrical mount portions, two bearings mounted respectively on the two opposed generally cylindrical mount portions, and two wheels, each of the two bearings comprising an annular backbone member and a plurality of ball bearings or roller bearings, the retention wall having two retainer lips and a central span extending between the two retainer lips, each retainer lip flaring radially outward from the central span, the first and second retainer lips being respectively in contact with the two annular backbone members.

11. The hubless caster of claim 1, wherein the hubless caster has a dynamic load rating of greater than 200 pounds.

12. The hubless caster of claim 11, wherein the hubless caster has a profile ratio of less than 0.5.

13. The hubless caster of claim 12, wherein the hubless caster has a weight of less than 0.6 pound.

14. The hubless caster of claim 1, wherein the bearing comprises, moving radially outwardly, an annular backbone member, a rolling element comprising a plurality of ball bearings or roller bearings, and an outer race portion.

15. The hubless caster of claim 14, wherein the bearing is a sealed bearing such that the ball bearings or roller bearings are housed inside a sealed enclosure bounded by the annular backbone member and the outer race portion.

16. A hubless caster having an open central corridor and comprising, in sequence moving radially outwardly, a generally cylindrical retention wall, a generally cylindrical mount portion, a bearing, and a wheel, the retention wall being a single integral wall consisting of a single body, the generally cylindrical mount portion comprising a ring-shaped wall radially inside of which the generally cylindrical retention wall is nested concentrically, the bearing being mounted on the generally cylindrical mount portion such that the ring-shaped wall is nested concentrically radially inside the bearing, the retention wall preventing the bearing from moving transversely off the mount portion by virtue of having a retainer lip carried directly against a transverse side of the bearing, the retention wall being molded to the generally cylindrical mount portion such that the retainer lip extends around and embraces, by being in contact with, the transverse side of the bearing, and wherein the hubless caster comprises a frame member from which the generally cylindrical mount portion projects transversely outwardly, the bearing being held on the generally cylindrical mount portion by virtue of being sandwiched directly between the central frame member and the retainer lip.

17. The hubless caster of claim 16, wherein the hubless caster has two opposed generally cylindrical mount portions, two bearings mounted respectively on the two opposed generally cylindrical mount portions, and two wheels, each of the two bearings comprising an annular backbone member and a plurality of ball bearings or roller bearings, the retention wall having two retainer lips and a central span extending between the two retainer lips, each retainer lip flaring radially outward from the central span, the first and second retainer lips being respectively in contact with the two annular backbone members.

18. The hubless caster of claim 16, wherein the bearing comprises, moving radially outwardly, an annular backbone member, a rolling element comprising a plurality of ball bearings or roller bearings, and an outer race portion, the bearing being a sealed bearing such that the ball bearings or roller bearings are housed inside a sealed enclosure bounded by the annular backbone member and the outer race portion.

19. The hubless caster of claim 16, wherein the hubless caster has a dynamic load rating of greater than 200 pounds, a profile ratio of less than 0.5, and a weight of less than 0.5 pound.

20. The hubless caster of claim 16, wherein the retention wall defines a radially inwardly oriented surface, the radially inwardly oriented surface being a facing surface that is exposed to the hubless caster's central corridor.

* * * * *